US009756082B1

(12) United States Patent
Haugsnes et al.

(10) Patent No.: US 9,756,082 B1
(45) Date of Patent: Sep. 5, 2017

(54) SCALABLE NETWORK SECURITY WITH FAST RESPONSE PROTOCOL

(71) Applicant: BrightPoint Security, Inc., Santa Clara, CA (US)

(72) Inventors: Andreas Seip Haugsnes, Mountain View, CA (US); Markus Hahn, Santa Cruz, CA (US)

(73) Assignee: SERVICENOW, INC., Santa Clara, CA (US)

( * ) Notice: Subject to any disclaimer, the term of this patent is extended or adjusted under 35 U.S.C. 154(b) by 74 days.

(21) Appl. No.: 14/855,310

(22) Filed: Sep. 15, 2015

Related U.S. Application Data

(63) Continuation of application No. 14/683,986, filed on Apr. 10, 2015, now Pat. No. 9,167,001, which is a continuation of application No. 14/536,386, filed on Nov. 7, 2014, now Pat. No. 9,038,183, which is a continuation of application No. 13/556,553, filed on Jul. 24, 2012, now Pat. No. 8,914,406.

(60) Provisional application No. 61/593,853, filed on Feb. 1, 2012.

(51) Int. Cl.
G06F 3/00 (2006.01)
H04L 29/06 (2006.01)
G06F 17/30 (2006.01)

(52) U.S. Cl.
CPC ...... H04L 63/205 (2013.01); G06F 17/30345 (2013.01); G06F 17/30424 (2013.01); H04L 63/0281 (2013.01); H04L 63/1425 (2013.01); H04L 63/1441 (2013.01)

(58) Field of Classification Search
CPC ............ G06F 21/552; G06F 17/30864; G06F 17/30386; G06F 17/30528; G06F 9/455; H04L 63/145; H04L 63/1416; H04L 63/1441; H04L 63/104; H04L 67/10; H04L 63/02; H04L 63/1433; H04L 67/1097
USPC .......................................................... 726/23
See application file for complete search history.

(56) References Cited

U.S. PATENT DOCUMENTS

| | | |
|---|---|---|
| 6,848,015 B2 | 1/2005 | Jones |
| 7,010,696 B1 | 3/2006 | Cambridge et al. |
| 7,076,801 B2 | 7/2006 | Gong et al. |

(Continued)

*Primary Examiner* — Joseph P Hirl
*Assistant Examiner* — Sayed Beheshti Shirazi
(74) *Attorney, Agent, or Firm* — Fletcher Yoder PC

(57) ABSTRACT

This disclosure provides a network security architecture that permits installation of different software security products as virtual machines (VMs). By relying on a standardized data format and communication structure, a general architecture can be created and used to dynamically build and reconfigure interaction between both similar and dissimilar security products. Use of an integration scheme having defined message types and specified query response framework provides for real-time response and easy adaptation for cross-vendor communication. Examples are provided where an intrusion detection system (IDS) can be used to detect network threats based on distributed threat analytics, passing detected threats to other security products (e.g., products with different capabilities from different vendors) to trigger automatic, dynamically configured communication and reaction. A network security provider using this infrastructure can provide hosted or managed boundary security to a diverse set of clients, each on a customized basis.

20 Claims, 12 Drawing Sheets

(56) References Cited

U.S. PATENT DOCUMENTS

| | | |
|---|---|---|
| 7,100,195 B1 | 8/2006 | Underwood |
| 7,603,711 B2 | 10/2009 | Scheidell |
| 7,644,365 B2 | 1/2010 | Bhattacharya et al. |
| 8,239,668 B1 | 8/2012 | Chen et al. |
| 8,321,944 B1 | 11/2012 | Mayer et al. |
| 8,914,406 B1 | 12/2014 | Haugsnes et al. |
| 9,038,183 B1 | 5/2015 | Haugsnes et al. |
| 9,137,258 B2* | 9/2015 | Haugsnes ............ H04L 63/1441 |
| 9,167,001 B1 | 10/2015 | Haugsnes et al. |
| 2003/0105911 A1 | 6/2003 | Jones |
| 2003/0133443 A1 | 7/2003 | Klinker et al. |
| 2003/0154399 A1 | 8/2003 | Zuk et al. |
| 2004/0221191 A1 | 11/2004 | Porras et al. |
| 2005/0097256 A1 | 5/2005 | Jones |
| 2005/0193429 A1 | 9/2005 | Demopoulos et al. |
| 2006/0031476 A1 | 2/2006 | Mathes et al. |
| 2007/0214220 A1 | 9/2007 | Alsop et al. |
| 2007/0261112 A1 | 11/2007 | Todd et al. |
| 2008/0034425 A1 | 2/2008 | Overcash et al. |
| 2008/0162474 A1 | 7/2008 | Thong et al. |
| 2008/0276098 A1 | 11/2008 | Florencio et al. |
| 2009/0210424 A1 | 8/2009 | Morohoshi |
| 2009/0328209 A1 | 12/2009 | Nachenberg |
| 2010/0114701 A1 | 5/2010 | Steelberg et al. |
| 2010/0175132 A1 | 7/2010 | Zawadowskiy et al. |
| 2011/0023119 A1 | 1/2011 | Rayes et al. |
| 2012/0109802 A1 | 5/2012 | Griffin et al. |
| 2012/0117509 A1 | 5/2012 | Powell et al. |
| 2012/0159624 A1 | 6/2012 | Konig |
| 2012/0328215 A1 | 12/2012 | Thong et al. |
| 2013/0007870 A1 | 1/2013 | Devarajan et al. |
| 2013/0060810 A1* | 3/2013 | Maman ............... G06F 17/3048 707/769 |
| 2013/0247193 A1* | 9/2013 | Zaitsev ................ G06F 21/552 726/23 |
| 2014/0032306 A1* | 1/2014 | Sukornyk ............. G06Q 30/02 705/14.43 |
| 2014/0172495 A1* | 6/2014 | Schneck ........... G06Q 10/0635 705/7.28 |
| 2014/0189873 A1* | 7/2014 | Elder .................... G06F 21/577 726/25 |
| 2015/0012339 A1 | 1/2015 | Onischuk |
| 2015/0156213 A1* | 6/2015 | Baker ................ H04L 63/1416 726/23 |
| 2015/0207813 A1* | 7/2015 | Reybok ................ H04L 63/145 726/22 |
| 2015/0264068 A1* | 9/2015 | Beauchesne ........ H04L 63/1416 726/23 |
| 2015/0264069 A1* | 9/2015 | Beauchesne ........ H04L 63/1416 726/23 |
| 2016/0164890 A1 | 6/2016 | Haugsnes |

\* cited by examiner

SCALABLE NETWORK SECURITY WITH FAST RESPONSE PROTOCOL

This application is a continuation of U.S. patent application Ser. No. 14/683,986, filed on Apr. 10, 2015, which in turn is a continuation of U.S. patent application Ser. No. 14/536,386, filed on Nov. 7, 2014 (now U.S. Pat. No. 9,038,183), which in turn is a continuation of U.S. patent application Ser. No. 13/556,553, filed on Jul. 24, 2012 (now U.S. Pat. No. 8,914,406), which in turn claims priority to U.S. Provisional Application No. 61/593,853, filed Feb. 1, 2012. Each of the aforementioned patent applications is hereby relied upon for priority and is incorporated by reference.

BACKGROUND

Fueled by recent advances in computer technology, an ever increasing number of companies and other enterprises continue to move to increasingly-electronic environments. It is not uncommon for a typical employee, for example, to have full network and Internet connectivity and software application capabilities at a remote laptop, smart phone or other portable device. Yet increasing reliance on these machines, particularly in the enterprise context, has led to unprecedented network security challenges.

Enterprises are especially at risk to directed attacks that attempt to overwhelm services, discover passwords and other valuable information, and otherwise misuse private network resources. The difficulty in detecting and mitigating these attacks is especially challenging when one considers the ever increasing use of the remote work place, and other cross-business "trusted" network connections that make it difficult to maintain a defined and pervasive "firewall" at network boundaries.

Various techniques have evolved in part to cope with these challenges. An enterprise having a private network can select from an ever increasing number of disparate products offered by different software vendors. While generally useful for their intended purposes, these systems require specialized training by dedicated personal for proper interpretation, deployment and maintenance; these systems are usually also incrementally added based on dynamic need, creating a hodge-podge of different systems, rather than leading to an efficient architecture that takes a client's current (and possibly dynamic) needs into account. Furthermore, one vendor's systems are typically incompatible with those of another vendor, leading to suboptimal solutions where a client must typically select a single vendor by balancing both advantages and disadvantages of the products of one vendor against another. Managed services have also arisen where the enterprise can contract a third party company to provide network management services, where the third party company remotely interfaces with the enterprise's security equipment or has personnel stationed on the enterprise's site to manage that security equipment; while generally beneficial to companies wishing to outsource IT security management, these solutions do little to address the vendor integration and custom architecture problems described above.

Figure 1:
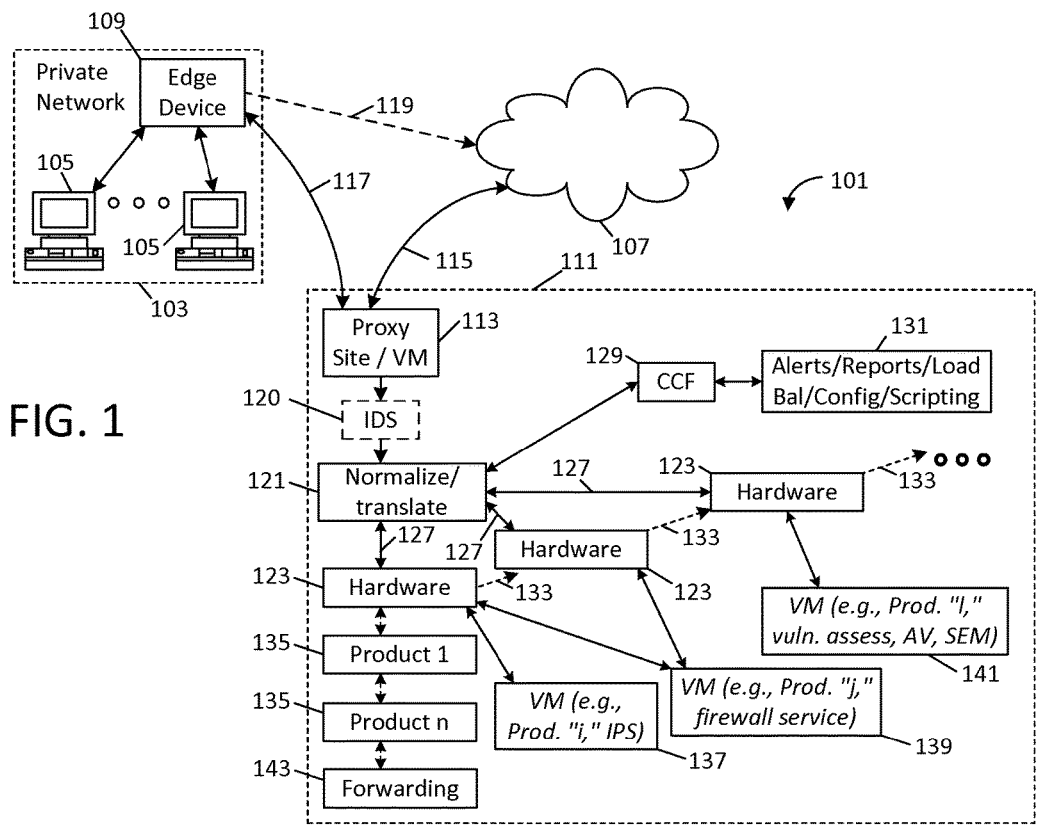
FIG. 1 provides an illustrative diagram 101 used to explain a security method and related embodiments.

The invention defined by the enumerated claims may be better understood by referring to the following detailed description, which should be read in conjunction with the accompanying drawings. This description of one or more particular embodiments, set out below to enable one to build and use various implementations of the invention or inventions set forth by the claims, is not intended to limit the enumerated claims, but to exemplify their application.

DETAILED DESCRIPTION

Introduction

The description set out below exemplifies (i) systems for providing network security (e.g., hosted by an enterprise or hosted for the enterprise by a third party), (ii) methods for providing network security (e.g., for one's own network or for a third party network), and (iii) other forms of devices an apparatuses (e.g., instructions stored on machine readable media, such as software performing the same or similar functions as these methods or systems, or which allows a software user to build or implement similar methods or systems). Generally speaking, these embodiments process inbound Internet traffic (including email, instant messaging, web browser access to web sites, media access, virtual drive access, file transfer, and other forms of wide area traffic) using a virtualization infrastructure that permits security software products from different suppliers to be mixed and matched, with translation and a common data format used for passing arguments between the software products, and otherwise dynamically building a custom security network.

To this end, this disclosure also provides integration techniques usable in a virtualization infrastructure which permit vendors of different security products to both enforce real-time response processing as well as permit asynchronous processing of more complex queries. This architecture facilitates interaction between different security products, even on a cross-platform, cross-vendor basis.

In one scheme, predetermined message types are used for interaction between different security products; for example, a format is utilized where all messages are either queries (e.g., requests for information), notifications (e.g., broadcast or new rules, policies, or of the presence of new security products/machines, and so forth) or configurations (e.g., requests to invoke specific or additional security products, services or machines).

In a second scheme, "cache-style" memory management processes are used to establish a cross-platform common communication framework ("CCF"). Requests for real-time information (e.g., queries regarding incoming possible network threats) are enforced by synchronous responses filled with available data from a memory cache; if no data is found, either a null response is sent or no response is sent in a specified time interval. This interval can be set by specification. The interval effectively defines "real-time" response, namely, a response time sufficiently fast to provide data needed to potentially block an access represented by a current network packet in-line, i.e., without atypical buffering or quarantine processes—it may consist of any time less than a few milliseconds to potentially seconds, depending on system configuration and other parameters). If no data is available (e.g., a threat is indeterminate), this second embodiment can proceed to asynchronously process the request/query, such that if it is later determined that a threat exists (or multiple such queries are later received, with information being aggregated to obtain query response data), then the memory cache may be filled without regard to the original requestor's timing needs, such that that "cached," updated data is immediately at-hand should a similar future request/query be received. As mentioned, an integration scheme represented by these techniques facilitates interaction between multiple security products, including products from different vendors.

In a typical application, a security network can be designed to perform intrusion monitoring and/or detection using distributed threat analytics, and responsive to results of intrusion analysis, to automatically take one or more actions using one or more security products run as virtual machines, though a translation layer (e.g., implemented using one or more API's). The virtualization infrastructure permits services to be added and subtracted dynamically, including new security software products from commercial vendors, potentially even in situations where those products are natively incompatible with one another; this environment also facilitates easy scaling of selected services. A common data format, communication scheme and scripting of automatic responses (for example) permits generation of an infrastructure where, notwithstanding which security software products are selected or deselected, reactions can be automatically invoked as reactions to detected threats (that is, these reactions can be designed for example even before services are selected, as part of the general infrastructure). To provide several examples, a threat detected by the intrusion monitoring or detection service (IDS) can be converted to a template or object with specific fields or attributes, and these fields or attributes can be used with a command or communication infrastructure to invoke macros or scripts that then import the rules, threats or other data into virtual machines (VMs) which have been selected for use on behalf of a specific private network. As should be apparent, each security product effectively relies on translation (either native, or effectuated with an API) to the common communication format, with standard query formats and scripting as appropriate. This architecture facilitates an environment where additional rules and policies can be automatically created and dynamically applied, providing a new degree of scalability and flexibility in network security management. Perhaps otherwise stated, normalizing inputs and outputs of various security products in a virtual environment facilitates a framework where services can be dynamically added as desired, and where new security policies and rules and interactions between these products can be automatically and/or flexibly created and applied.

Note that in some specific embodiments discussed below (a) the intrusion detection service (IDS) or different or alternate IDS products from different software manufacturers can be implemented as virtual machines and optional services, (b) the methods can be implemented as a hosted security service to provide security to one private network or to an array of different clients' private networks (e.g., on a "service bureau" basis), each client having a different suite of custom-selected and dynamically-changeable services, and (c) the architectural platform discussed above can be implemented within a single enterprise, either as a custom or a commercial solution, or as software (i.e., instructions stored on machine readable media). In each of these embodiments, predetermined message types as noted earlier can be transmitted across a security network and used to invoke response from other services or machines. For example, detected events can be used to trigger requests/queries for information, a notification of a detected event, or a request for a new configuration (e.g., for a new rule or policy, or a new VM). The first two of these action types can be broadcast to all VMs in the security network, whereas the last type of message is typically formatted as a specific function call to a specific destination open up a new VM instance or to instantiate a specific rule or policy. By building these capabilities into existing proprietary security products, or implementing this functionality via one or more APIs, each security product can essentially be made to talk to other security products through a standardized interface that permits exchange of detected events, requests for information and that calls for new or different services, all on a completely automated basis.

Note that these techniques permit dynamic interaction between VMs, prior to detecting results, in a manner that can improve reliability. Thus, using requests for information (e.g., an IDS querying another system whether captured metadata represents a threat), it is possible for an individual security product (i.e., VM in this implementation) to rank possible threats and apply processing dependent upon the reputation associated with each individual threat, all prior to reporting an event or otherwise responding. As mentioned above, one embodiment provides for a cache management scheme/multi-tier response structure where queries associated with relatively sophisticated analysis can be processed with or without enforced response time requirements. By leveraging standardized deployments, these techniques empower existing security products to perform real-time lookups prior to making a decision of the outcome, or alternatively, to elect for more reasoned analysis, or to use both of these methods. These techniques also enable significant reduction in the processing and logging of superfluous data, i.e., by enabling security products to emphasize only confirmed threats and/or results of processing.

Prior to proceeding with the description, a few general terms used by this disclosure will be introduced. The terms "intrusion detection system" (IDS) and "intrusion monitoring" are generally used interchangeably, that is, to refer to a system that detects threats by monitoring wide area traffic, although not necessarily being able to block or otherwise remedy those threats; generally speaking, however, intrusion detection or "IDS" will be used to refer to such monitoring services. The "Internet" is used as a moniker for any wide area network (or "WAN"), i.e., security for world wide web (www) applications hosted by private network is a principle application of the techniques provided by this disclosure, but it should be understood that the teachings herein can be applied to any wide area network, including potentially applications such as Bluetooth, phone networks, semi-private and private networks and most other forms of wide area network that present unknown security risks—the term "Internet" is used both to refer to the world wide web as well as any of these forms of WANs. The term "cloud" refers to an unknown part of this WAN, with unknown or unspecific destinations and sources of traffic. A "private network" is any type of network or sub-network (subnet) where it is desired to provide security, and can include for example, a home network, the network of an enterprise or company, a governmental or institutional network (e.g., a university network) and so forth; the term "client network" should be understood to primary refer to a private network that is paying a third party for hosted security services, i.e., the "client" is the one paying for or otherwise receiving the benefit of security services to protect its network, and the third party possesses or manages security for the network of the client using techniques provided herein—the devices (e.g., computers, servers and routers) of the client represents the "client network" and the devices of the third party used to provide security represent the "security services network" or "hosted security network." Note that the "client network" can also encompass other third party networks, e.g., the networks of trusted business partners, customers of that client, contractors, semi-trusted networks of others (e.g., a foreign subsidiary of the client), and potentially other third parties. The term "real-time," as introduced above, refers to timing that is sufficiently fast as to enable in-line processing a packet or data in transit (e.g., as part of a normal processing pipeline or buffering scheme for traffic in general), and may consist of an interval or seconds or a much shorter response time—in some specifically contemplated implementations, this is effectively implemented as a specific, maximum response time defined by specification, e.g., 1 millisecond. Finally, as alluded to earlier, "traffic" can include any form of messaging or communication over a "WAN," including packets, emails, instant messaging, secure transactions, web site accesses, telecommunications, media transfer, and many other forms of communication, whether encrypted or not.

General Structure

FIG. 1 is an illustrative diagram 101 used to explain a security method 101 and related embodiments. In particular, a private network 103 is seen at the left as including a number of computers 105 that seek access to web pages or otherwise to communicate (i.e., transmit or receive information) out-of-network; these machines may represent web sites or other applications of the private network that are to be remotely accessed by third parties. Such web pages and other out-of-network communications are graphically depicted by a cloud icon 107, to denote that their sources and/or destinations could be anywhere on the Internet or other form of a public wide area network (WAN). As is typical for private networks, both inbound and outbound communications are routed through an edge device 109, which serves as a border device (or collection of devices) for the private network 103 and which may also optionally provide security functions such as a network firewall and other services. For large networks (e.g., company networks), an administrator or network security team would conventionally manage security, for example, using software at the edge device 103 or at other network devices, on an ad hoc basis. To cite some examples, it would be conventional to provide some level of antivirus screening, source blocking, spam filtering, and perhaps content filtering (e.g., to screen offensive, copy-protected or otherwise inappropriate material), all typically implemented by custom, reactive programming by the administrator or security personnel. Note that although depicted as one "device," the edge device 109 represents potentially many machines and tools that cooperate together to provide data processing and forwarding including, for example, routers, load balancers, forwarders, exchange servers, and many other types of devices.

In accordance with the teachings of this disclosure, automated management is provided as a supplement or replacement to the manual and custom services indicated above, in part, by using a security architecture represented by dashed-line box 111 in FIG. 1. Note that this depicted service may optionally be implemented outside of the private network 103, that is, at a remote network, with Internet traffic inbound to the private network being instead directed to a proxy site 113 and only thereafter being farmed out within the private network, for example as represented by paths 115 and 117. In embodiments where this automated management is performed within the private network 103, it should be assumed that the functions within box 111 are integrated with the edge device 109 (again, which may consist of any number of network machines and associated components and tools) or otherwise within the private network.

More specifically, inbound Internet traffic is received at a proxy site 113 and is then processed by services implemented as one or more virtual machines (VMs). A virtual machine in this context should be viewed as software running on non-specific hardware platform, using an emulated instruction set as necessary or appropriate. Generally speaking, in the system of FIG. 1, each virtual machine will consist of a security software product of any vendor, with emulation software sufficient to run the security software product on nonspecific hardware. The security software products can include an intrusion detection system (IDS), also referred to sometimes as an intrusion detection system (IDS), a firewall system (FWS), an intrusion prevention system (IPS), a security event manager service (SEMS), an antivirus service (AVS), a vulnerability assessment tool (VAT) or any other form of security software product (e.g., for email or any other form of network traffic). Generally speaking, an IDS monitors traffic patterns using distributed threat analytics, meaning that packets or messages representing diverse communication (different sessions, users, or destinations) are analyzed to detect patterns representing a distributed network threat. If the IDS detects such a threat, for example, concentrated requests for access to a web page of the private network 103 from a single source or small group of sources (representing a possible denial of service attack), the IDS typically generates an alarm, alert or other response to indicate this fact. As part of an integration scheme mentioned below, for example, in one hypothetical implementation, an IDS can review local, fast access memory (e.g., a cache implemented in random access memory "RAM") for security threats matching one or more identifiers for machines or applications (e.g., IP addresses, such as an IP address range passed as part of a query, a MAC address, URL, etc.). If the IDS has a record matching a specified identifier with a specific threat indication (e.g., threat level="high"), the IDS can send a response to a FWS that causes the FWS to block the associated traffic, in real-time. Typically, the FWS might issue a query for a syn packet that commences an Internet transaction. If the IDS is not aware of such a threat, the FWS receives no response to its query (or alternatively, a null response), which permits the Internet session to proceed (again, in real time). If network delays, the need to access mass storage, or the need for further processing cause a valid threat to be not detected, an asynchronous process run (in addition to the non-response or null response) can cause the cache to be updated (e.g., without further response to the FWS), such that the IDS cache is "ready" should a similar query be received in the future (whether from the FWS or any other VM). Clearly, other implementation options also exist.

Note that an IDS typically does not itself take direct mitigation action responsive to such an alarm, e.g., this would conventionally be left up to the manual actions of a human network administrator. A FWS typically is positioned at or near the edge device and typically simply either blocks or allows individual messages according to pre-established rules or policies; for example, a FWS might reject traffic originating from a specific sender IP address. Also note that an IPS typically provides a more sophisticated form of filtering, for example, by routing or otherwise filtering traffic matching specific patterns; an IPS can take a number of different actions depending on rule and policy, for example, quarantining messages (e.g., emails with attachments), querying the source, routing traffic in a specific manner and so forth. A SEMS is typically a customized framework for coordinating multiple specific systems, and typically also manages alerts and archiving for the human administrator, based on relatively slow correlation across large amounts of historical data. An AVS typically filters individual messages for viruses or other malware. Finally, a VAT typically tests a specified system (e.g., a client system) to assess vulnerability to attacks, for example, by testing for system misconfiguration, application misconfiguration, application loading and response times, port errors and other forms of vulnerabilities. Note that many such products are available today from various manufacturers including Microsoft, Cisco, Juniper Networks, Symantec, and many other companies.

In the embodiment depicted in FIG. 1, it should be assumed that software products from these various manufacturers are run as virtual machines (VMs) with inputs and outputs translated to a common communication format (CCF) with common message types (mentioned earlier) used to trigger interaction between those machines. Thus, for example, a Cisco software IDS product can be used to trigger a VAT port scan by a software product from a different vendor; this interaction might be formatted as a request for a new configuration with a passed argument (in the form of the CCF and translated data). Again referring to the example integration scheme discussed above, a VAT port scan typically might not be relied upon for real-time response and, thus, a response to the configuration message might be automatically generated at the time the port scan is completed, i.e., with no pending, active security operation stalled awaiting its completion. Note also that the use of plural products of the same type is also expressly contemplated. That is to say, the architecture presented in FIG. 1 permits for example two IDS systems to be used in parallel, each providing respective results. A client administrator can evaluate competing software products (to select one for implementation on a more-long-term basis), or alternatively, can use these products for more sophisticated behavior (e.g., a voting process where two products of the same type are used in parallel to obtain greater sensitivity in detecting attacks and assessing associated threat levels, or to provide for a suite of varied responses depending on the product detecting the threat). Again, the use of a VM platform with translation and broadcasting of events facilitates nearly any type of desired behavior. Note that in addition to or in lieu of automatically invoking a predetermined message type (request for information, notification, request for new configuration), other forms of triggers or scripting may also be used depending on embodiment.

Thus, inbound Internet traffic received at proxy site 113 (that is, Internet traffic traveling in the direction of the private network) is passed to one or more virtual machines for processing. FIG. 1 indicates that first virtual machine (VM) 120 is configured to provide IDS services; notably, this VM is depicted in dashed lines to indicate that in this embodiment, an IDS is optionally used to screen all traffic received at the site, prior to normalization of that traffic. Results of using this VM are then normalized by a translation layer 121 and passed to one or more VMs, seen here to include hardware 123 having one or different software products 1-n (numbered 135 in FIG. 1). Note that a VM can include plural applications (e.g., 137, 139) running on a single piece of hardware, a single application (e.g., 141) running on a single piece of hardware, or a single application implemented as multiple virtual machines and running on several pieces of hardware (e.g., 139). Again, each application can be a software product from a different vendor or manufacturer or the same or different type of software product relative to other applications; in FIG. 1, VM 137 is exemplified as an IPS, VM 139 is exemplified as a FWS, and VM 141 is exemplified as a SEMS. In the system of FIG. 1, the translation layer 121 normalizes the inputs and outputs of each VM, in a manner so as to enable a common set of messages representing function calls, scripts, macros, load balancing or other programming to be applied; the results of these functions is one or more messages broadcast to multiple VMs or transmitted to a single VM, for example, using a network protocol (e.g., TCPIP). This translated exchange with each VM is identified by reference numeral 127 in FIG. 1. Note that as indicated by box 129, each exchange involves a common communication format (CCF); reaction (including the generation of alerts, reports and other rules or configurations) is indicated by reference numeral 131. Note also that in alternate embodiments, the IDS (and indeed, any number of IDS products) can be implemented as one or more post-normalization VMs, e.g., an IDS can optionally be treated as any other software product, generically represented by numeral 135. Once any required processing has been completed (e.g., processing by the IDS 120 only, and preconfigured or triggered processing by other VMs 133, 135 and/or 137 through the translation layer 121), forwarding circuitry 143 is then used to forward the processed inbound Internet traffic on for distribution through the private network, for example, to various machines (105).

One benefit also provided by the architecture illustrated in FIG. 1 is the ability to easily scale hardware and selected services. To illustrate this point, expansion arrow 133 indicates that the security services can be scaled by adding additional VMs on additional hardware 123 as necessary. In one embodiment, this scaling is automatic; in other embodiments, scaling can be conditioned on administrator approval (e.g., client fee approval), or automatically performed within predefined parameters and requiring approval only once specified milestones are reached. Thus, to illustrate this point, if it is assumed that a specific software product (e.g., a Cisco IPS) can effectively manage up to a predetermined packet rate or number of users, as flow dynamically changes, additional machines can be transparently rolled into service as new configuration requests to handle temporary or long term bandwidth issues. Load balancing can be performed using dedicated machines, although in FIG. 1, it is illustrated as being managed by scripting or other reactive functions, e.g., when flow exceeds an VM maximum, additional VMs are automatically established, with the proxy site 113 or an associated router or IPS automatically configured to reroute messaging to the pertinent VM. Notably, in one embodiment discussed further below, this type of approach facilitates service bureau methods where hosted security can be performed on behalf of a client, and where the client is charged fees on a micropayments basis, e.g., the client pays for each piece of hardware or VM only to the extent (duration and/or flow) consumed. When traffic levels fall below minimums, surplus VMs can be phased out. In an environment where specific, predetermined message types are used, as referenced earlier, this scaling can be automatically provided by new configuration requests, which are checked against any pre-arranged client limits or parameters, and then automatically invoked as new VMs. In a hosted environment, a client administrator can use a secure web portal or other interface to remotely and dynamically change management parameters as needed, for example, by dynamically authorizing additional services and/or VMs (e.g., above pre-configured client limits or parameters, if any). A TCP based memory access scheme (e.g., consistent with the integration and memory management examples introduced in this disclosure) facilitations this process, that is, is completely consistent with this scalability.

As mentioned above, Internet traffic inbound to the private network is routed through the proxy site 113 and is forwarded by forwarding circuitry 143. A number of mechanisms exist to ensure that inbound Internet traffic is forwarded by the Internet (e.g., "by the cloud") in this manner. For example, the client can change its public domain name service (DNS) entries to list the proxy site. Alternatively and/or in addition, the outbound Internet traffic coming from the private network 103 can be processed so as to add headers or other fields that will cause any return traffic to go through the proxy site. To provide two examples of this, outbound Internet traffic can be routed to the proxy site 113 and/or other equipment represented by box 111 and a X-Forwarded-For (XFF) process can then be used to direct this traffic outward to the cloud, effectively routing it via paths 117 and 115. A return path is thus inserted into this communication so as to ensure that replies are directed to the proxy site 113. An advantage of this technique is that the private network 103 may choose to have screening employed on outbound traffic, e.g., antivirus screening and/or screening for inappropriate material or access to inappropriate sites, for example, implemented as additional VMs. It is also possible for the edge device 109 of the private network to perform this or a similar insertion and instead direct its outbound traffic via dashed-line route 119, with a return path inserted so as to direct reply communications to the proxy site 113. In the case of email messaging, domain keys (DK) and/or domain keys identified mail (DKIM) message headers may be modified, for example, to insert a value for the proxy site 113 into the "d=" or "i=" headers as appropriate. Analogous techniques exist for other forms of network communications. Again, a specific implementation can be used depending on whether the processes presented in FIG. 1 are employed as part of a single enterprise's security efforts, or are performed on a service bureau basis for multiple clients. Examples of each of these implementations are provided further below, and it is possible to have mixed implementations, e.g., in a service bureau environment, one client's private network can direct its outbound traffic directly to the cloud, while another client's private network may choose to route all outbound traffic through the service bureau network.

Reflecting on the architecture illustrated in FIG. 1, a number of advantages should be apparent. First, the use of a virtual machine architecture, and a normalization and translation process, permits ready and dynamic scaling of software security products and dynamic selection and deselection of those products. A software product may be selected and implemented as a virtual machine in a desired position or posture with other network security services, literally in minutes, with any existing configuration automatically updated to mesh with the newly selected product. The use of a virtual platform permits integration of software products generally without substantial need to modify or otherwise specifically configure the private network 103. A client represented by that private network 103 can thus be assured of having up-to-date security software products, and ability to dynamically switch between products and scale, without having to necessarily pay annual or similar license fees with each release, and without need to pay substantial fees before product performance can be evaluated. Second, while virtual platforms for software are known, the use of translation and, in particular, the use of a common communication format (CCF) using predetermined message types and/or other structure for communication exchange irrespective of security service permits different products with different capabilities (and from different vendors) to be used dynamically and interchangeably. More specifically, an intrusion detection system (IDS) can be employed to detect problems, with scripting then used to automatically take preemptive or curative actions using other products, not just specific products, but to classes of products having compatibility types that permit different products to address the same problem in different ways. This interoperability between machines is facilitated using techniques for normalizing data and invoking certain predefined, standard messages, effectively as function calls between machines. Further below, the use of templates and other approaches, and associated integration techniques, will be presented to exemplify implementation of these features and related capabilities.

Figure 2A:
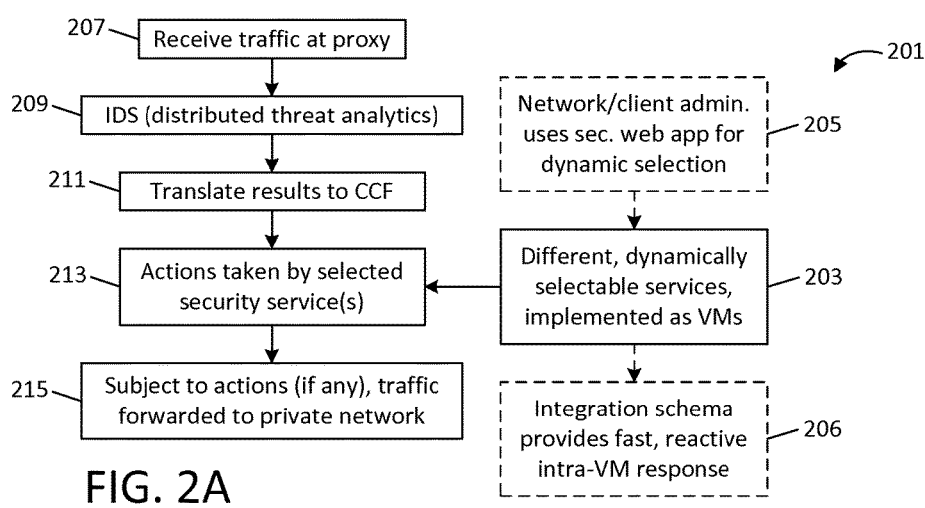
FIG. 2A provides a block diagram used to explain a security method 201 in which different security services (e.g., different types of services, and different vendors' products) are implemented as virtual machines (VMs), and are used to interface with an intrusion monitoring or detection service to provide scalability and adjustable reaction capability.

FIG. 2A is a block diagram used to explain a security method 201 in which different security services (e.g., different types of services, and different vendors' products) are implemented as virtual machines, and are used with an intrusion monitoring or detection service to provide scalability and adjustable reaction capability. This FIG. presents one hypothetical configuration of multiple VMs. Note that as with the embodiment discussed just above, this method permits dynamic selection and deselection of security services for a private network, implemented as respective virtual machines, as indicated by reference numeral 203. Per numeral 205, the selection amongst different selectable services can be optionally performed by a client administrator, for example, via a secure web application; per numeral 206, an integration schema provides fast reactive intra-VM response, for example, using the multi-tier real-time/asynchronous processing techniques introduced earlier.

With services being selected and appropriate VMs being instantiated, traffic is first received at a proxy site, as indicated by reference numeral 207. The traffic is then processed by or otherwise routed (209) to an IDS system, which performs distributed threat analytics on the inbound traffic; traffic is also routed as preconfigured for the private network, e.g., to other VMs for processing as appropriate (see, e.g., FIG. 3C, below). In addition to this preconfigured processing, detected threats or other results from the IDS can be used to trigger conditional functions, for example, scripted commands to another of the VMs, such as for example, to invoke a new rule or policy. To provide one example, relating to conditional "extra" AVS scrutiny, if the IDS system were to detect traffic patterns implying a heightened virus or malware threat, the results of the IDS indicating this fact could be scripted to cause an IPS to route a portion of the inbound traffic to a specific AVS VM. This scripting could be a implemented as a native function of an IPS product, or on a custom-basis by an administrator for the particular security network. It might be the case that a remote client network already has antivirus capabilities, but in this example, the distributed threat analytics would be used to invoke added AVS scrutiny through a standardized interface based on triggers generated as a result of traffic pattern analysis. Per reference numeral 211, results of the IDS processing are translated to a common communication format (CCF), e.g., a template or database record associating a specific IP address (source or destination) or other identifier for machine or application with a particular vulnerability or threat level; in one embodiment, these results include a variety of data from the IDS and, in a second embodiment, only alerts from the IDS or responses to queries are translated as events and logged or exchanged between machines using CCF. Note that as will be discussed below, in many implementations, metadata (e.g., a binary record of traffic) can be produced continuously and logged, either the IDS, by scripting, or by a separate VM. Should a threat be detected or other need for action, predetermined message types (i.e., a CCF) can be used to invoke the pertinent VM and associated security service, per numeral 213, relying on these logs (i.e., on the archived metadata) as necessary. Elaborating on these points, a reply to a query can provide a uniform resource indicator (e.g., a "URI" or "URL") which provides a network access to metadata contained within the log, or another source of non-cached data associated with data carried by a query response; also, reputation can be enhanced by permitting the IDS to query other systems as to whether or not identified metadata represents a threat—thus, short of a detected threat, if supported by the specific IDS, the IDS can issue a "request" for information on a broadcast basis to other services, with arguments being passed using the CCF and optionally, the memory management scheme and other integration techniques introduced below. Alternatively, if a threat is detected, this information can also be normalized and broadcast to other services using the CCF; that is, using a network communication protocol (e.g. TCPIP), a message can be sent out to all other VMs broadcasting an event, with each recipient service having functionality to modify policies or take corrective actions responsive to the detected threat, and potentially to retrieve additional, non-cached data. Note that the combination of predetermined message types and the use of common network transmission protocols facilitate interaction between different platforms and security products. In addition, the IDS can also issue a request for a new configuration (e.g., a new VM instance corresponding to an existing or new service, within pre-established client authorization limits). This functionality can either be supported natively by the particular security software vendor as an engrained aspect of its products, or it can be effected via an API that sits on top of the IDS (or other VM).

Again, per process 203, each service operating in the desired client network can be arranged in advance as virtual machines, for example, by a client administrator, and can be running in the background or made active by a trigger from the IDS. Depending on the selected service(s) from a pool of available services, the aforementioned message types (or alternatively, a particular pool of scripts and triggers) can be made automatically available to the client based on a capability type which matches a capability type of services selected for use on behalf of the specific private network. These functions can be modified by the system as threats emerge or as software updates or scripting updates otherwise occur. Further examples and detail will be provided further below. As finally denoted by process block 215, subject to the IDS and any pertinent security actions (i.e., functions provided by the additional, selected security service(s) beyond the IDS), traffic is then forwarded on to the private network (e.g., a client network).

Figure 2B:
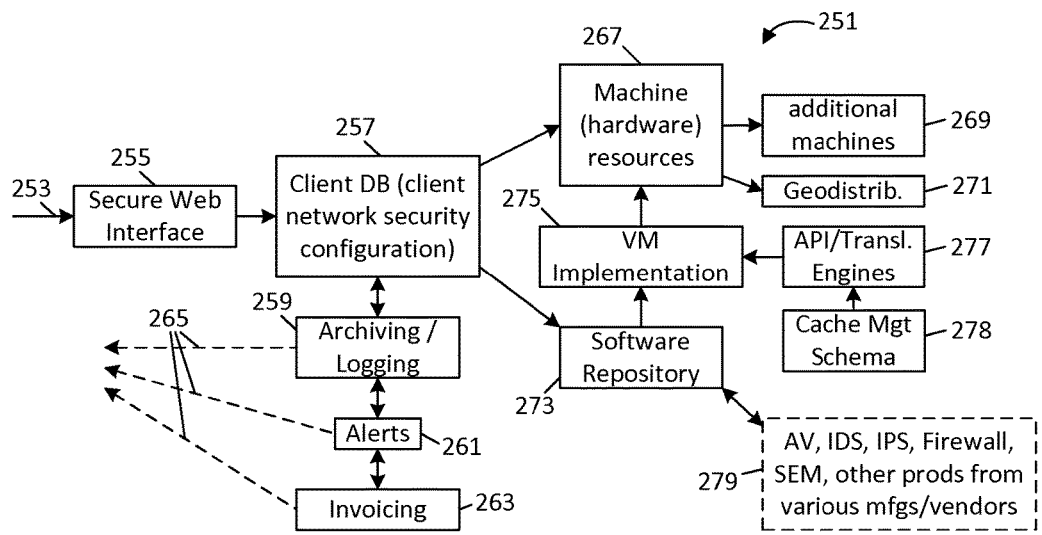
FIG. 2B provides a block diagram 251 of a hosted security architecture, where a client uses a secure web interface 255 to dynamically select (add) and deselect machines and services as virtual machines (VMs).

FIG. 2B is a block diagram used to explain a hosted security method 251, where a client uses a secure web interface 255 to dynamically select (add) and deselect machines and services as virtual machines. More particularly, FIG. 2B is used to explain how services can be hosted for a client network on a managed service or a service bureau basis. Arrow 253 represents access to the secure web interface 255 by a client administrator. The administrator is provided with dynamic capability to select various security software services, which as mentioned, can be different commercial software products running on a virtualized platform. The administrator can also specify bandwidth limits used to provide automatic VM scalability up to a predetermined limit; if the system needs to exceed these limits, the administrator can be alerted, for example, via the secure web interface 255 or via an email alerts or other alter system (generally represented by arrows 265). As the administrator effects changes in services, and/or rules, policies and scripting as desired, these changes are recorded in a client database 257 which represents a record defining the security service configuration for the associated private network, and which also provides a billing record (in the event the security services are provided on a micropayments or "pay-as-you-go" basis). As seen with reference to functional boxes 259, 261 and 263, the implementation stored in the client database is used in defining archiving and logging parameters, alerts, and invoicing. Depending on the network configuration defined by the client record, individual machines (hardware) can be managed (267), with machines being added or removed from use based on the client database record (269) and with machines being used in selected geographies, for example, geographically distributed data centers (271). In this regard, it is noted that one optional automated function (described further below) permits reactive routing of Internet traffic meeting certain parameters to specific machines and/or specific geographies; thus, for example, if a particular network is experiencing a high volume of directed attacks originating from "geography A", as detected by the IDS, it is possible to automatically and dynamically reroute all such traffic to a dummy server located in "geography A," or otherwise to quarantine such traffic through appropriate routing. This capability is enhanced if choices exist to use machine (hardware) resources (267) at different data centers (271).

As indicated, the client database specifies the security services configuration for each specific client, and in this regard, represents a selection amongst multiple, individually selective software products having different capabilities and generally representing different vendors' products (273). Any selected products are each automatically implemented as one or more virtual machines, per reference numeral 275, and can be run in the background or activated as needed, for example, based on IDS requests for new configurations and appropriate translation (277), with data exchange using a memory management scheme 278 (e.g., based on the "cache" techniques introduced earlier). As noted by dashed-line block 279, the selectable services can generally include AV, IDS, IPS, FWS, SEMS and other types of security products (that is, security products having similar or other capability types).

Figure 3A:
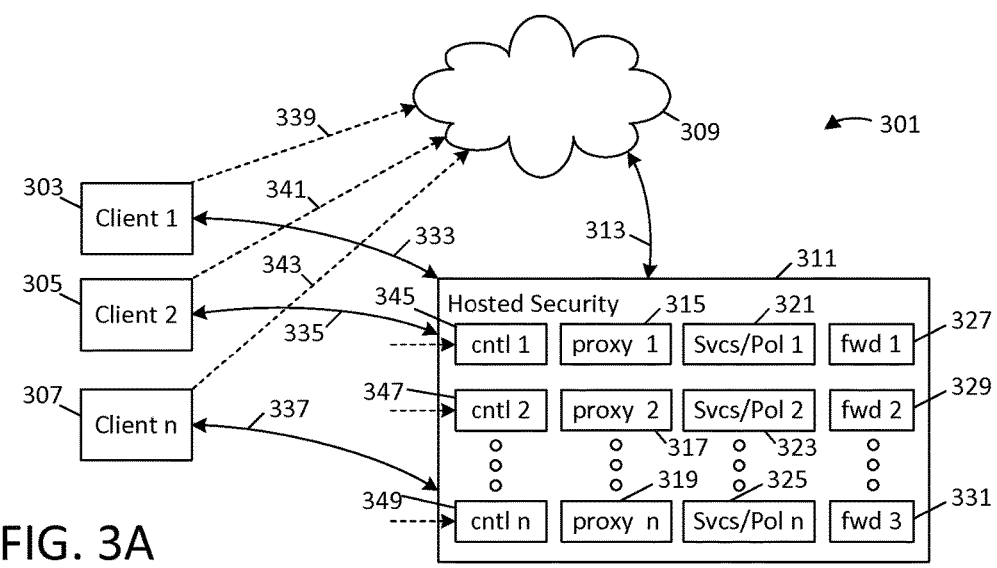
FIG. 3A diagrammatically illustrates a hosted security service (generally designated 311), where a "service bureau" remotely services a diverse set of clients with client-specific resources and services.

FIG. 3A provides a further illustration of a configuration 301 for a hosted security service 311, namely, one that services a diverse set of clients with client-specific resources and services. More particularly, this figure is used to help illustrate a service bureau method, that is, where security services are provided for multiple remote client networks for a fee. In this implementation, it should be assumed that n clients each have respective networks 303, 305, 307 for which the clients wish to procure hosted security services. Once again, a cloud graphic 309 is used to represent a WAN such as the Internet. As was the case before, inbound traffic intended for distribution within the respective client networks 303, 305, 307 is directed to respective proxy sites within the hosted security network. The hosted security service 311 in this case represents a network controlled by the service bureau provider, and thus not only receives traffic from the cloud (as represented by path 313) but is also separated from each of the client networks by the cloud as well, as represented by three respective paths 333, 335 and 337. With security services performed remotely from each of the client networks 303, 305 and 307, it is desired generally to maintain a level of confidence in the post-security processed traffic and, to this effect, each of the paths 333, 335, 337 between the service bureau network 311 and the respective client networks are typically secure paths, for example, a secure tunnel formed as a virtual private network or otherwise using IPSec, SSL or similar processes. Note that these paths 333, 335, 337 all travel across the WAN (e.g., through the Internet or other applicable network) but are shown separately to reflect separate encryption for each client. As with the embodiments discussed above and below, a number of implementation variations exist, e.g., each client network 303, 305, 307 can forward all of its outbound Internet traffic through the service bureau network 311 for relay to ultimate destinations via path 313, or each client network can also simply communicate outbound Internet traffic to the cloud directly, as represented by paths 339, 341, 343, or redirect inbound traffic to the service bureau network 311.

As part of the service bureau network 311, each respective client network 303, 305, 307 is given its own dedicated proxy site or sites, labeled 315, 317 and 319 in FIG. 3A. That is, at least one and potentially any number of sites are given to each respective client for direction of inbound traffic for security processing. Thus, for example, if a hypothetical company "ABCZ, Inc." was to route its traffic through hypothetical service bureau network at "servicebureau.com," ABCZ, Inc. would be given one or more exclusive proxy site addresses within servicebureau.com such as ABCZ.servicebureau.com or ABCZ.US.servicebureau.com, ABCZ.EP.servicebureau.com, and so forth. Clearly, these examples are not meant to be limiting, and any naming methodology can be used. The use of one or more dedicated sites for each client network 303, 305 or 307 permits a unique set of rules and services (e.g., VMs) to be applied to all outbound traffic traveling through that site in accordance with security network configuration for the specific client, e.g., any specified IDS or other security service can be automatically applied to all received traffic, with unique services, policies, rules and other customizations, separately selected and applied for each client network. This client-specific customization (e.g., by respective administrators) is represented by respective control boxes 321, 323 and 325. While it is optional that outbound traffic from the client network to the cloud also be processed in this manner, it is contemplated that in a typical implementation, a specific client network will choose to have inbound and outbound traffic both processed by the security services network, but in different manners customized to the client through services selection and scripting. Again, an administrator for the specific client network can, using the VM infrastructure introduced earlier, build any desired network protocol using different and dynamically selectable security products, defining an entire security network infrastructure literally within minutes. For outbound web access Internet traffic, a X-Forwarded-For (XFF) process is typically used, for outbound email traffic, a "d=" header based technique is typically used, and for other network traffic, analogous processes are used so as to ensure return path specification to the pertinent proxy site. As depicted by respective sets of forwarding configurations (e.g., circuitry/machines configured to forward inbound traffic to the respective client network 303, 305, 307 using appropriate routing and encryption), once the customized services and processing represented by boxes 321, 323 and 325 have been applied, with any filtering, blocking or other processing applied as appropriate, that remaining inbound traffic which is suitable for forwarding is conveyed to the respective client network.

As introduced above, each client network 303, 305, 307 is optionally provided with a respective secure web interface 345, 347, 349 for dynamically changing services (e.g., tearing down, reconfiguring, adding to or otherwise modifying configurations, including selection and deselection of services and setting automatic bandwidth maximums and minimums). Such a secure web portal is established by well-known web application processes, and typically relies on 2-factor or better security to authenticate an authorized client administrator or administrators acting on behalf of each client network. To provide an example, a particular client could elect to authorize up to a predetermined number of VMs to provide a specific service (e.g., if each VM services up to a maximum number of flows or packets, a client administrator could effectively pre-authorize use of "up to three" machines, with additional bandwidth expansion restricted without further client administrator authorization).

Reflecting on the structure depicted by FIG. 3A, the VM-based architecture and CCF usage introduced earlier permits a single entity (e.g., a service bureau) to provide for-fee or other services on an independent basis for each of multiple client networks (that is, for multiple private networks). A client database (not shown in FIG. 3A) stores amongst other information client security network configuration that allows the hosted security architecture to be uniquely customized for each client using what are effectively fungible resources built from the VM architecture, with translation and normalized/standardized communication between components. Each client can dynamically select and remove services and reconfigure its security functions in real-time, as desired, retrieve metadata, run vulnerability assessment tools, and generate reports. In addition to this dynamic capability, translation and interaction as has previously been described is automatically applied to each system, so as to apply automatically generate communications and apply reactive functions depending on the VM services selected by the pertinent client.

Figure 3B:
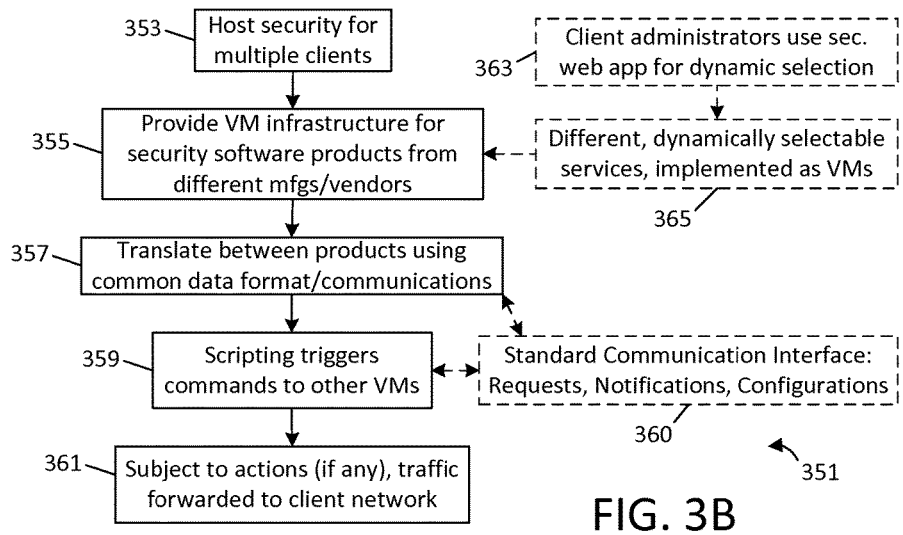
FIG. 3B provides a block diagram of another hosted security method 351, where multiple clients are serviced using respective services suites; each client can independently add and deselect virtual machines (VMs) for automatic interaction via respective secure web interfaces.

This architecture is further illustrated in FIG. 3B, which shows a method 351 where multiple clients each use respective services and policy suites, and where each client can independently add and deselect virtual machines via respective secure web interfaces. As denoted by boxes 353 and 355, a service bureau can host security for multiple clients through its own network, providing a virtual machine (VM) infrastructure for these clients to pick and choose security software products from different manufacturers or vendors. Translation and a common communication format (CCF) are used to permit these products to communicate with each other in their virtualized environment, and use of a limited set of predetermined message types are used to trigger actions responsive to the detected threats, with arguments passed between VMs using the CCF. Subject to any desired processing (e.g., baseline configuration) and any triggered actions responsive to a detected threat, traffic which has been suitably processed or filtered is then forwarded on to the particular client network. These actions are respectively represented by function blocks 357, 359, 360 and 361. As noted above, each client can have a security web service application made available to its proxied administrators, with these administrators dynamically selecting services and building a network configuration as appropriate (363, 365).

Figure 3C:
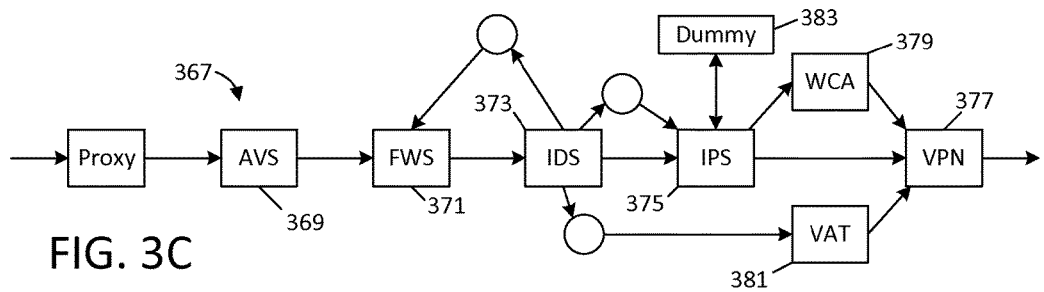
FIG. 3C shows a hypothetical security configuration which can be dynamically defined for a client network.

FIG. 3C provides a hypothetical example of one baseline configuration 367 which could be instantiated by a client. In particular, a graph indicates that a client has built a virtual network consisting in sequence of an antivirus service (AVS) 369, a firewall service (FWS) 371, an intrusion detection service (IDS) 373, an intrusion prevention service (IPS) 375 and a VPN forwarding structure 377. The particular client also has elected to have a web cache application (WCA) 379 and a specific vulnerability assessment tool (VAT) 381 conditionally invoked as potential threats are identified, with specific attacks redirected to a dummy machine 383. Each system is built as a virtual machine (VM). In FIG. 3C, round shapes represent automatic communications applied by the system, to invoke or otherwise control conditional actions of others of the VMs in response to detected threats. As should be apparent, this configuration can be specific to the particular client, with other clients electing to have other configurations and fewer or greater resources. Note that the interaction invoked is dependent on the services selected for the particular client, with additional rules and configurations automatically applied on an evolving basis, i.e., as threats are detected. The client can also use its secure web interface to electively add, delete or modify the policies de facto applied by any specific machine 369-383, with configurations, policies and associated metadata for traffic received by the client stored in, or otherwise identified by, the client database. Bandwidth parameters elected by the client are not separately depicted in FIG. 3C.

Note that it was earlier mentioned that a number of different configurations can be used to implement principles discussed above. Some of the contemplated configurations are introduced by examples presented in FIGS. 4A through 4E; other configurations will also be apparent to those having skill in the art.

Figure 4A:
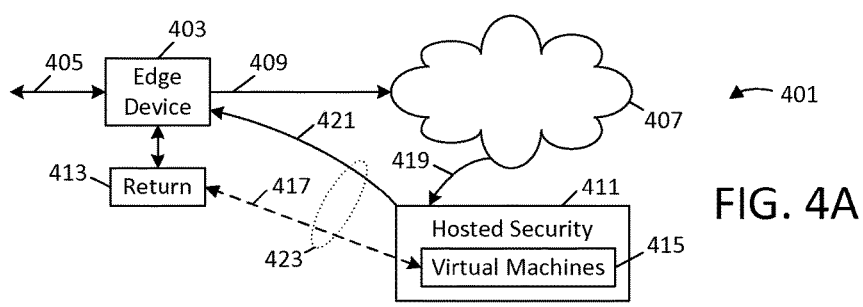
FIG. 4A shows one configuration 401 for a hosted security service 411, where a private network (represented by edge device 403) directs outbound traffic to a wide area network ("WAN," represented by cloud icon 407), but where return traffic and other traffic inbound to the private network is directed to the hosted security service 411.

More particularly, FIG. 4A shows one configuration 401 for a hosted security service 411, where a private network (represented by edge device 403) directs outbound traffic to a wide area network ("WAN," represented by cloud 407), but where traffic from the cloud (including return traffic) is directed to the hosted security service 411. The traffic can come from various sources including messaging, web accesses from the private network to the cloud or vice-versa, FTP transactions and other forms of one or two way exchanges. As introduced above, private network on its end (per box 413) can change its public DNS records to point to a proxy site or sites (not shown in FIG. 4A) within the hosted network 411, and otherwise syncs up inbound Internet traffic with a return destination identifying the proxy sites or sites; the correspondence between the private network's actions and the particular proxy site or sites is represented by path 417. In this particular case, outbound traffic represented by path 405 is forwarded by the edge device to the cloud, as represented by path 409 with any appropriate return path information inserted as appropriate, such that response traffic proceeds via path 419 to the hosted network 411 and the appropriate proxy site therein. As noted by box 415, virtual machines (VMs) have previously been configured to supply baseline processing as well as interact with one another via standardized communications to respond to detected threats. Subject to processing of this traffic by the hosted service, traffic is then forwarded over the Internet to the private network via secure VPN, along route 421. The secure VPN in this case is represented by reference numeral 423. Thus, FIG. 4A identifies a configuration where inbound Internet traffic to the private network is processed by a hosted security service 411, but where the private network on its end manages communications directly with the cloud so that the inbound Internet traffic takes this route. This implementation is advantageous for private networks wishing to process their own outbound traffic, particular where the private network itself wishes to screen outbound traffic, or does not want a third party (such as hosted security service 411) to have visibility into certain information (e.g., personal information) outbound from the private network.

Figure 4B:
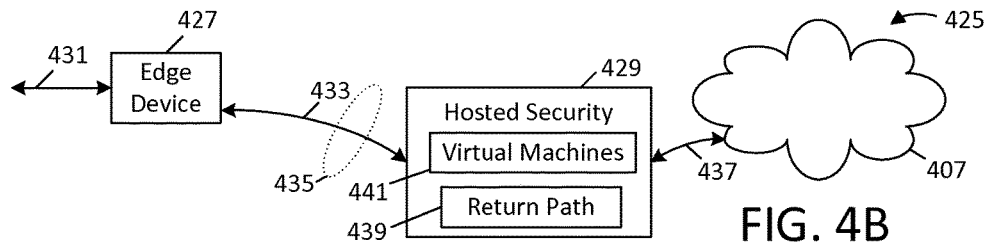
FIG. 4B shows another configuration 425 for a hosted security service 429; in this configuration, a private network (represented by edge device 427) routes all outbound traffic and receives all inbound traffic through hosted security service 429; the hosted security service can optionally at its end modify outbound traffic to insert a return path such that return traffic is directed to the hosted security service for forwarding to the individual private network.

FIG. 4B shows another configuration 425 for another hosted security service 429; in this figure, numerals repeated from FIG. 4A should be assumed to represent like elements. A private network (represented by edge device 427) routes all outbound traffic and receives inbound traffic through hosted security service 429; that is, unlike the embodiment of FIG. 4A, the private network simply routes all outbound Internet traffic out over the Internet to the hosted security service 429 over path 433. As was the case before, the private network also updates its public DNS entries to point inbound web accesses to the proxy site (not shown) within the network of the hosted security service 429. On its end, the hosted security service uses an XFF protocol or other protocol where it effectively specifies a return path (439) on outgoing traffic from the private network and, optionally, the private network can implement VMs (441) that perform outbound traffic processing (e.g., AVS, content screening, blocking of specific destinations and so forth, as has previously been described). The outbound traffic is then routed over path 437 to the cloud 407. Inbound traffic (whether return traffic or otherwise) is processed in the manner indicated above, that is, is received at the proxy site, processed by VMs 441, and forwarded post-security screening over a secure path (path 433 or another path) and then is routed within the private network, as indicated by numeral 431. The secure VPN for at least traffic inbound to the private network from hosted security service 439 is denoted by reference numeral 433. Reflecting on the configuration represented by FIG. 4B, this implementation is advantageous for private networks wishing to outsource security for both inbound and outbound traffic, e.g., the private network can elect to have the hosted security service 429 perform all conventional forms of network security for all external traffic whatsoever.

Figure 4C:
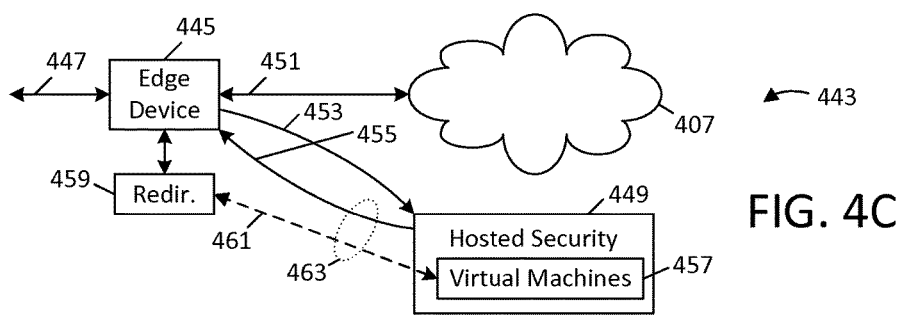
FIG. 4C shows yet another configuration 443 for a hosted security service 449; unlike the configuration of the foregoing FIGS., the private network (represented by edge device 445) itself handles all traffic with the cloud, but redirects inbound traffic (and optionally outbound traffic) to the hosted security service 449 for security processing.

FIG. 4C shows yet another configuration 443 for a hosted security service 449; unlike the foregoing examples, the private network (represented by edge device 445) itself directly handles inbound and outbound traffic with the cloud (via path 451), but itself transparently redirects inbound traffic (and optionally outbound traffic) to the hosted security service 449 for security processing via path 453, and receives return, security-processed traffic from the hosted security service via path 455. This implementation has the advantage that no changes to the private network's DNS names are required, but it does require extra routing and potentially additional infrastructure on the part of the private network. The edge device 445 receives outbound traffic from its network intended for the WAN via path 447 and also distributes screened, inbound traffic along this same path. At least for inbound traffic from the WAN, the edge device 445 redirects that traffic as indicated by box 459. Once again, the private network ensures that its redirect destination corresponds (461) to the address of the desired proxy site (not shown in FIG. 4C). At the hosted security network 459, the redirected traffic is processed by VMs 457. Once screening is completed, filtered traffic is returned to the edge device 445 for routing within the private network. Note that a secure protocol (e.g., VPN, SSL, etc.), denoted by numeral 463, is used at least for "backend" configuration of the security network via path 461 and forwarding of screened traffic back to the edge device 445. Note also that, as contrasted with the implementations mentioned earlier, the scheme represented by FIG. 4C is amenable to completely transparent use of the hosted security service 449, e.g., although separated from the private network by the Internet, the private network can be perceived as both source and destination of the WAN traffic as appropriate, removing or avoiding if desired any externally identifiable indicia that the hosted security service was used. This scheme also presents the advantage that a private network can elect to process some, but not all, of its traffic using the hosted security service. For example, a private network might choose to have external web accesses to its website routed through hosted security service 449, but may choose to internally process employee emails using self-managed antivirus and malware scanning prior to delivering emails to an exchange server. Many variations of a mixed security outsourcing model are possible using the presented frameworks.

Figure 4D:
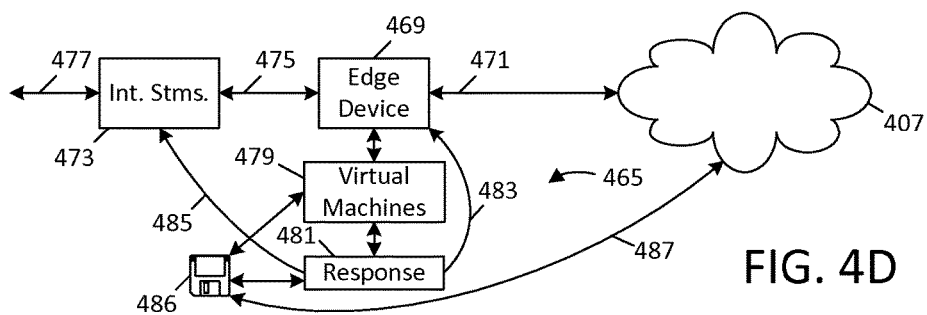
FIG. 4D shows still another configuration 465 for a security service, this time entirely structured within the private network needing security services, and where communication path 471 represents a connection to the public Internet (or another WAN).

FIG. 4D shows still another configuration 465 for a security service, this time entirely structured within a private network, where communication path 471 represents a connection to the public Internet or another WAN. Note that especially in this case, the principles articulated above can be implemented in software entirely within the enterprise (e.g., within the private network), in the form of a commercially-distributed software package or in the form of a custom-built solution. As before, the cloud is represented by numeral 407, with inbound and outbound traffic traveling between an edge device 469 and internal systems 473 within the private network via paths 475 and 477. However, instead of sending traffic outside of the private network for screening, the edge device 469 sends the traffic to internally-hosted VMs 479. These VMs perform client-configured processing as described before, with interaction produced by the VMs (in the form of responses 481, provided over control paths 483 and 485) being used to control the internal systems 473, the edge device 469, or other processes. This operation is like the operations described earlier, but in this case, communications, and data are more easily customized to interact with equipment internal to private network (e.g., that might lie in a separate network from any service bureau); for example, translation and triggers can be interfaced with any conventional private network device, such as for example, routers, secure web apps, load balancers and other equipment internal to the private network. This operation is also possible with a hosted security service (e.g., per FIGS. 4A-C, above), but many private networks may elect to limit control over their own internal systems as a matter of preference. Note that as was the case before, the communications or other scripting used in association with the VMs can include the new creation or configurations of rules or policies with arguments passed using a standardized interface such as with predetermined broadcast message types and data being passed in a common communication format, using a template- or object-based approach for events and data (such as discussed below) or the memory management techniques discussed herein. Note that the framework for providing this infrastructure, including commercial security products to be implemented as VMs can be provided with underlying code which sets up the virtualization environment for different software apps (e.g., as instructions stored on machine-readable media 486), or can be separately installed via web download or activation, per path 487. It is also possible for the platform for hosting the VMs to be built partially or entirely from scratch within the private network.

Figure 4E:
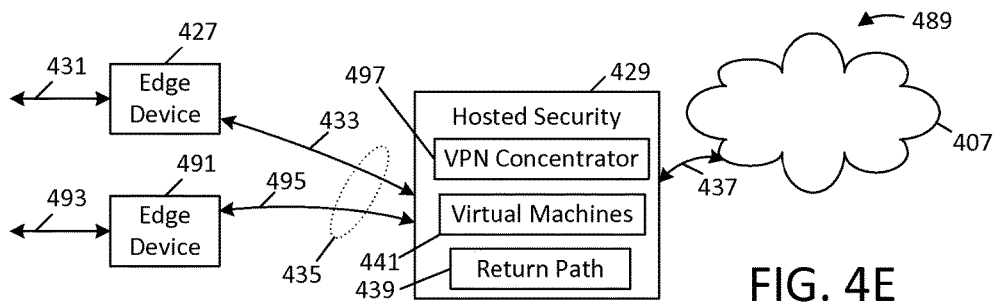
FIG. 4E shows another configuration 489 for a hosted security service, namely, one in which a VPN concentrator 497 consolidates outbound Internet traffic from multiple private networks, again represented by edge devices 427 and 491.

FIG. 4E shows still another configuration 489 for a hosted security service 429, namely, one in which a VPN concentrator 497 consolidates Internet traffic from multiple private network edge devices 427 and 491. This implementation provides a number of benefits for a client wishing to provide remote access to trusted third parties, such as business partners and contractors, each represented as separate private networks, but which are to appear to the outside world as having a common affiliation with the client. For example, edge device 427 might represent the perimeter of a large enterprise (e.g., a large company, or the government), while edge device 491 might represent the perimeter of its contractor; under these circumstances, it may be desired that the large enterprise dictate security requirements for the contractor's sponsored or affiliate web traffic. The implementation is depicted as similar to the implementation seen in FIG. 4B; once again, like numerals represent the same elements as introduced earlier.

In a typical implementation, outgoing traffic from each private network is sent out to the cloud 407 by the hosted security network via path 437, using VMs 441 with channeled DNS and return path treatment (represented by numeral 439). A VPN concentrator 497 is used to support multiple encrypted tunnels for each respective stream of traffic, and can also be used (e.g., in conjunction with other VMs) to route traffic in between the two private networks (e.g., with no processing, or with specific processing relative to traffic involving the cloud 407). Common VPN concentrators (such as from Cisco and other manufacturers) support multiple encryption protocols, and thus, secure communications (represented by numeral 435) can be handled very differently with each private network. This implementation provides a number of advantages for the trusted access model, i.e., different security models can be specified for "direct" trusted access to the client network versus for inbound traffic from the cloud, with each security model built, configured or reconfigured using services dynamically selected by client's proxied administrator.

With the general structure and methods thus presented, this disclosure will now turn to a more detailed discussion of the software architecture of a hosted security service. In particular, FIGS. 5A-9 are used to describe implementation options. Following this discussion, this disclosure will provide some example communications and responses (i.e., examples of automated responses to distributed threat analytics facilitated by the teachings of this disclosure, exemplified by FIGS. 10A-10E); finally, this disclosure will present some commercial application examples (i.e., with reference to FIG. 11).

Design of an Exemplary Hosted Service

Figure 5A:
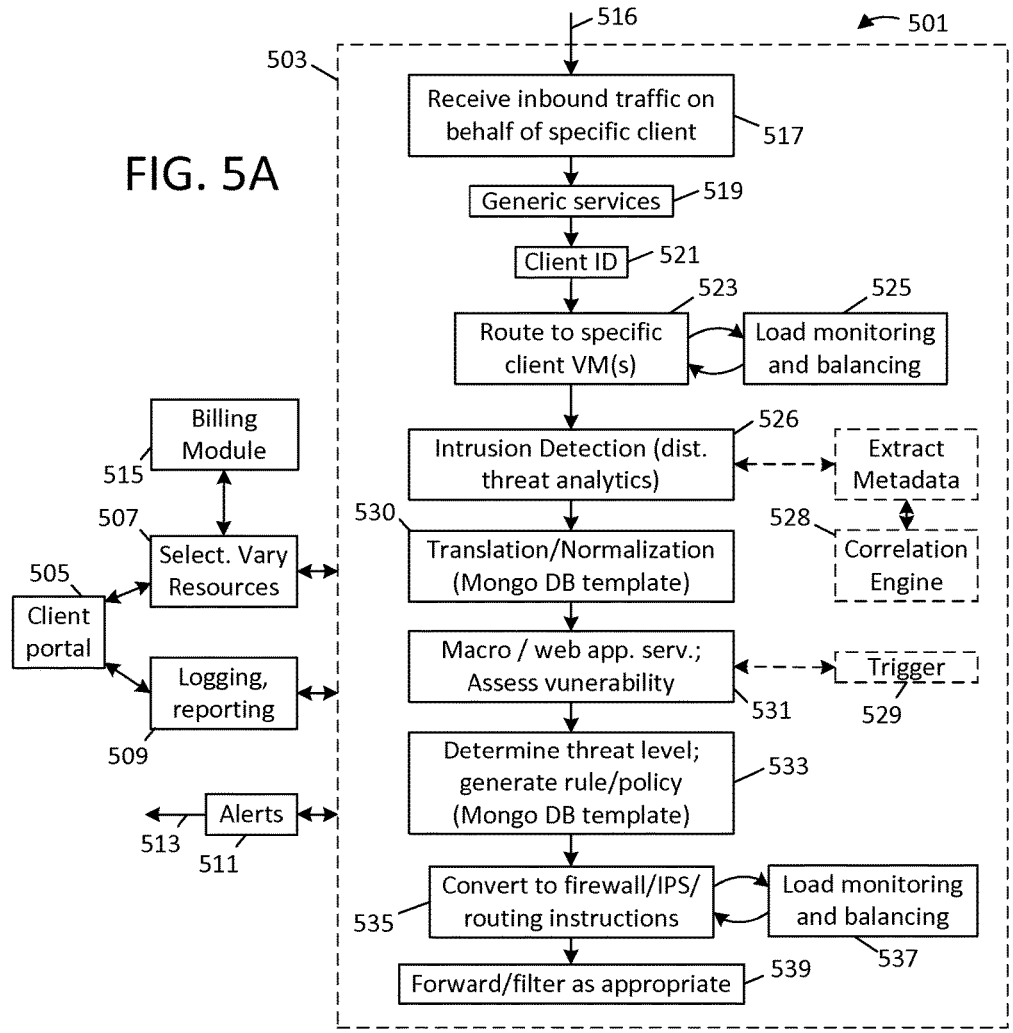
FIG. 5A shows a typical client implementation 501 using a hosted security service; the hosted security service provides intrusion monitoring based on distributed threat analytics and associated reactive capabilities.

FIG. 5A shows a typical client implementation 501 using a hosted security service. In a typical implementation, an administrator proxied by the client builds a default configuration by establishing VM services (as core services, 503) using a client portal 505. That is, the client can log into this portal 505 using a secure web interface to initially select a suite of hardware or software resources, and then can dynamically adjust those resources as conditions warrant, per function block 507. The client typically proxies multiple network administrators for this purpose, e.g., each with at least some authority to define network security parameters. This same group or a different group can also be provided with log access, metadata access and report functions, per block 509. The generated reports can be tailored to different level of abstractions for differed management levels or other reporting purposes, or can provide drill downs for specific VM performance, vulnerabilities, detected threats, load management, or other system parameters. Alerts (511) representing threats in progress (or threats recently resolved) can be retrieved by administrators via the portal or alternatively can be pushed to the administrators as email alerts (per arrow 513). As noted, configuration changes made via the portal are recorded as part of the client database and are optionally sent to a billing module 515 (e.g., for the case where software is being licensed to the client on a subscription or consumption basis).

Inbound traffic is received at a proxy site associated with a specific client, and default processing is performed on this message, such as for example metadata archiving and basic antivirus and malware scanning, per function blocks 517 and 519. A suite of services selected by the client administrator is then invoked depending on the client specified configuration, for example, as stored as a record in association with the client per block 521; this set of services can include a string of services such as was diagrammatically indicated in FIG. 3C, with each selected service once again being implemented as a virtual machine. Traffic received at the proxy site is routed to VMs in the specified sequence (523) with load monitoring and balancing within any pre-authorized bandwidth limits established by the client record being automatically performed (per numeral 525). As mentioned, this load balancing can be effected by scripting or in other well-known manner.

Numeral 526 depicts the performance of distributed threat analytics. Typically, this is performed by pattern processing the metadata captured and logged earlier in the process, using a correlation engine 528. Any associated results, including any detected threats, are exported, with a translation and normalization (530) being used to convert the results, especially detected threats, to a common data format. The translation can take a raw input, for example, data representing an event, and convert it into a table or other structured format, such as an XML description with several fields respectively for an identifier, port address and threat level. For example, data can be generated in XML form and used either in this manner or converted to a format used by all VMs (with either native support for the selected format or APIs as appropriate to provide translations for each machine. To exemplify, a particular VM (e.g., an VAT VM) might generate data having the form:

<xml>
<IPAddr>123.123.123.123</IPAddr>
<Port>80</port>
<threat>high</threat>
<xml>.

This event could be used as-is if supported, or could be converted (e.g., by API) to a string such as {"dst_ipv4":123.123.123.123, "dst_port":80, "threat":high}.

Now that an IDS VM, for example, can see what the "dst_ipv4" and associated "threat" fields are, it can also look them up by query. Scripting (e.g. macros, per block 531) associated with a VM for example can then issue queries and process results to generate triggers 529, which essentially enforcing certain predetermined commands or rules which invoke other VMs. As denoted by block 531, the trigger could, for example, be used to invoke a vulnerability assessment tool using arguments passed by the common communication format. Note that as contrasted with a SEM which might be used to generate an alert or other action, the CCF can be used with plural VMs, i.e., the CCF can be used to broadcast messages (e.g., as a notification) to multiple VMs, with native security product code (i.e., the software product itself) or an API providing reactive capabilities; perhaps otherwise stated, one threat can be used to trigger multiple VMs (with the same or different capabilities), all through preprogrammed (VM) capabilities or through scripting or configuration via the secure web interface. As indicated by FIG. 5A, in one implementation, events are represented a specific template, created and logged in a database; for example, Mongo DB or another structured framework could be used to provide such a system. In one example, if a threat is correlated with a specific identifier (e.g., source or destination IP address, MAC address, etc.), then upon a determination expressed in the template that the threat is "high," the CCF automatically provides a broadcast message that can be "understood" by a FWS (if implemented); real-time processing can be facilitated using the "cache" based VM response scheme introduced above and discussed below in connection with FIGS. 7A-8D. Threat processing in general is collectively illustrated by numerals 531 and 533 in FIG. 5A. Importantly, load balancers (535) are applied at each given tier; should a particular service be flooded with traffic, then load monitoring and balancing is applied specific to that service to invoke new VMs as appropriate to maintain throughput (e.g., up to pre-authorized bandwidth limits, per numeral 537). Finally, any remaining traffic which has been processed and determined to not present a threat is forward by forwarding circuitry, per numeral 539, onto the client network.

While FIG. 5A shows one exemplary configuration, a client using the architecture described earlier can build any desired VM infrastructure, with or without an IDS as may be desired by the particular client. In this light, it would be helpful to further discuss the event data structure as well as how coding is used to facilitate communication between different VMs, particularly those that implement software from different vendors.

Figure 5B:
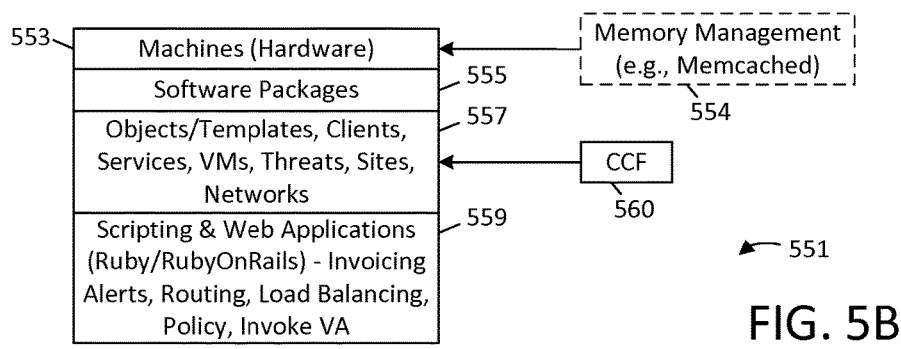
FIG. 5B shows a layer model 551 to illustrate an exemplary software architecture for a security service that permits dynamic selection and deselection of different security services; in particular, respective layers include machine layer 553, application software layer 555, the use of objects and templates 557 to provide a common communication format 560 and facilitate standardized memory interaction and responses, and associated scripting and web applications 559.

FIG. 5B shows an exemplary layer model 551 to illustrate different levels of code for implementation a security service that permits dynamic selection and deselection of VM services; in particular, respective layers include machine configuration 553, application software implementation 555, the use of objects and templates to provide an event data structure 557, and scripting and web applications which effectuate a normalized communication infrastructure 559. Thus, an entity wishing to build a hosted network infrastructure codes the individual machines (hardware) to serve as a virtual platform for the different, supported software products, and codes the virtualization infrastructure, as represented by reference numeral 553. Each software product either natively supports (or supports through the use of one or more suitable APIs) a memory management scheme 554 which provides support for real-time queries as well as more sophisticated analysis as indicated by box 554, in one embodiment, this memory management scheme can be implemented as a TCP based form of direct access, for example using Memcached. Layer 555 represents software applications on this infrastructure, in a manner where instances can be created as virtual machines as desired. At a third layer, template generation and data mining provide a normalized event data structure, for example, by converting all events and raw data into a standardized XML description such as introduced just above. Finally, web application infrastructure and associated APIs and scripting are implemented as a fourth layer, as depicted by box 559, with a standardized interface (i.e., cross VM communication format) being indicated by numeral 560; in one embodiment, this infrastructure relies on code and scripting written in Ruby and Ruby On Rails to implement functions of invoicing, VM configuration, secure web portals, load balancing, automated policy generation responsive to detected threats, and commands between VMs. As mentioned earlier, these communications capabilities can also be retrofitted into existing commercial security software products.

Figure 6A:
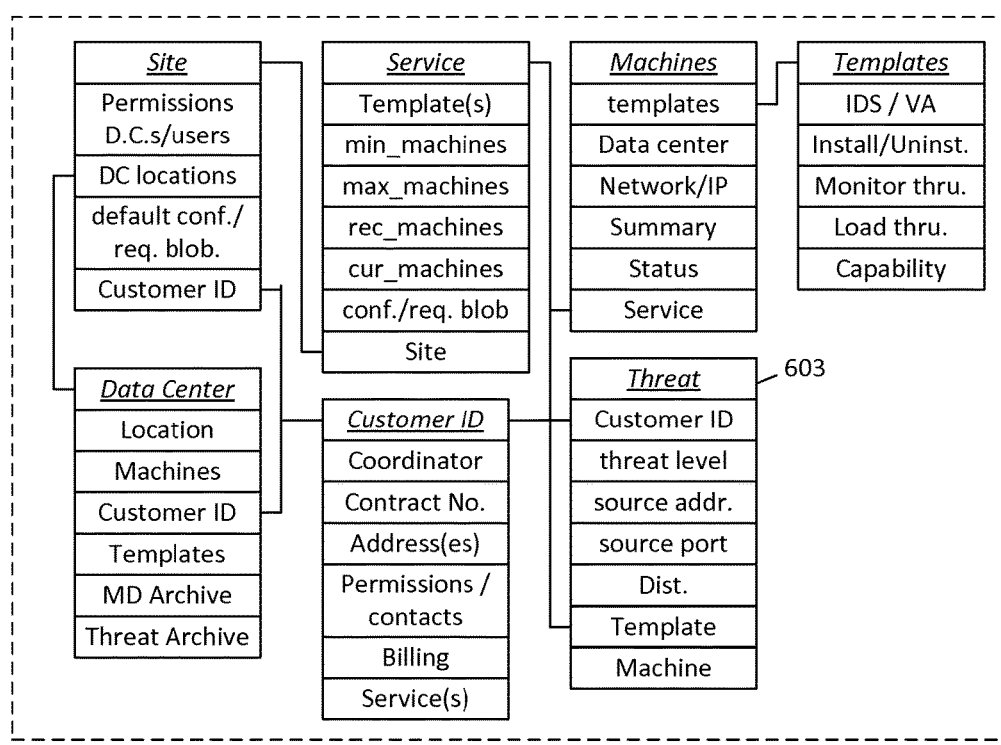
FIG. 6A provides an illustrative diagram 601 showing a template structure that can be used to normalize data exchange and facilitate communication between two or more VMs.

As alluded to earlier, standardized communications and passing of events back and forth can be effected in a number of ways. FIG. 6A is used to illustrate (601) a template-based format for a security system. The template-based format provides a partial means of establishing the various VMs, on a customer-specific basis, for exchanging information representing threats between VMs, and for commanding reactions to detected threats by specific VMs. As exemplified above, this structure can also be implemented by using an XML translation scheme. To provide a specific example, the "threat template," generally designated by reference numeral 603, is used to provide normalized, translated data in this implementation, which identifies specific IDS results determined by the IDS to represent threats. Note that this data format can be used in a number of ways, e.g., it is possible as mentioned above to compare the IDS products of two different competitors to evaluate those products and to effectively provide a reputation service. The template generated by one of these products is substantially identical to the template generated by the other, indicating the template or service producing the threat, the source address and port, the targeted customer, and whether the threat level is gauged at low, medium or high. Note that APIs built in advance as part of the infrastructure and, more specifically, the translation layer, perform any conversions/translation to get to these results. Thus, for example, an IDS from one particular vendor may not natively represent threat levels in this manner, but the translation layer converts data output by the IDS into this type of assessment, to normalize that data and enable the comparison or sophisticated behavior just mentioned. This was exemplified earlier. If two IDS systems evaluate the same traffic from the same source to be threats, one determined to be a high threat, the other determined to be low for example, this information could be considered in selecting a long-term IDS product. Alternatively, different sets of policies/scripting could be invoked depending on which vendor's product (i.e., which "Template" in this example) identified the threat as high, and so forth; that is, a high threat level from one IDS product can invoke a first reaction (e.g., reply requests for information, or other form of reaction), while a high threat detected by another IDS product can electively be used to trigger a different response (e.g., from a VM with different capability).

In FIG. 6A, the "services" template identifies a software application, the "machines" template indicates a specific piece of hardware assigned one or more virtual machines and the "templates" template identifies a single instance of a service running on a machine as a single virtual machine. For example, a particular "service" would reflect a specific vendor IDS product (intrusion detection or monitoring product, vulnerability assessment tool, or another type of product). As implied by the template's attributes, each created template identifies current throughput, active status, and whether the specific software instance has a capability to detect specific threats (e.g., malware, denial of service attack, etc), assess specific vulnerability (e.g., port scan or software misconfiguration), block ports and so forth, as represented by an alphanumeric code for the "Capability" attribute. To exemplify usage, if a threat template produced from a specific source (e.g., "template" template) has a specific threshold (e.g., threat >="medium"), then another template (aka an instance of a VM in this example) or a service with a specifically desired capability type can be activated and passed the threat as an argument as a reactive measure; to further elaborate this point, a firewall service (FWS) can step-in in response to a broadcast notification identifying a specific threat, in a manner that all "listening" FWS VMs (or a specific FWS) add the source identified in the provided threat argument to its list of blocked sources.

During configuration, a client administrator adds "services" (which are generally associated with one or more templates) and authorizes minimum and maximum numbers of machines, and as implied by the "site" attribute, can authorize these on a specific site (network) basis. Notably, the "site" and "data center" templates are used to manage equipment at geographically dispersed locations; introducing an example that will be used further below, a hypothetical service might have data centers in the US, in Europe, in Japan (Tokyo) and in Singapore. If attacks against a client are determined to arise from a specific geography, the threat can be used to automatically route traffic from the specific geography to a specific data center, to concentrate and isolate the attack, and prevent it from affecting services (with clean traffic routed to other data centers so as to not be impacted by the attack). A client can have machines at any number of data centers supported by the security services provider, as selected and elected by the client (e.g., for fee), and can install different networks across data centers using the "sites" template. As implied by the name, the "Customer ID" template is linked to a specific customer configuration and is used to identify permissions and perform authentication, and for billing and other purposes.

The foregoing represents one preferred implementation model, but there are other ways that can be used to implement a virtualization architecture as described above. For example, an object-based programming approach can also be used, with both threats and services defined as objects. When a threat object is created, it can be passed in course to a service object for processing and can also be used to, depending on attributes of the object, call or invoke a service (e.g., for specific types of threats). Note that an object-based approach is also represented by FIG. 6A, i.e., the design of objects as threats or services, each object having attributes used for scripting and event translation, is conceptually analogous to templates design and usage. As will be shown below, a relational database can also be used to build a system, although as implied, it is believed the templates-model presented above presents the framework best suited to web application development at the present time.

Figure 6B:
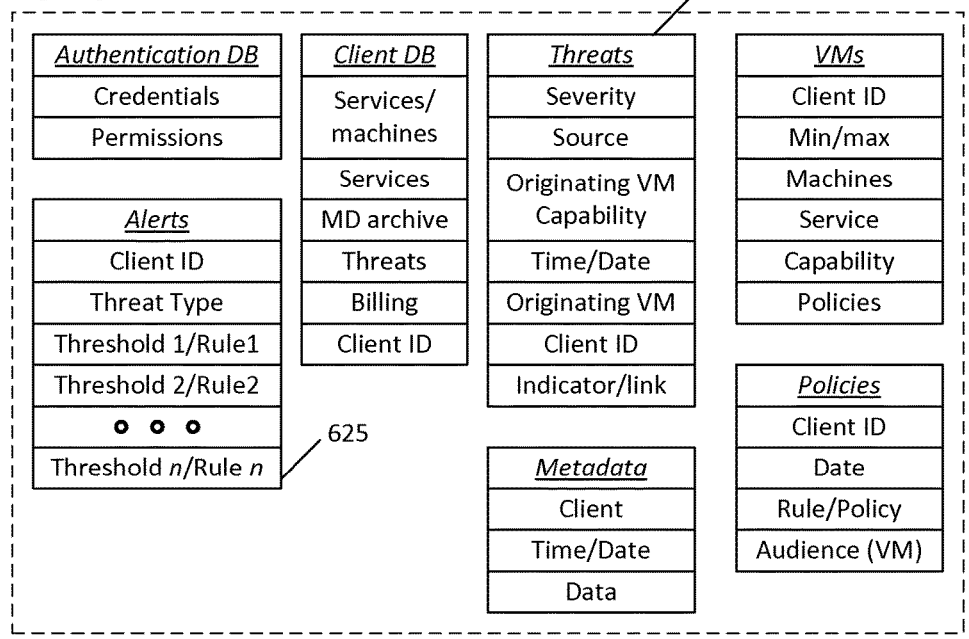
FIG. 6B provides an illustrative diagram 621 showing how a relational database can be implemented in an alternative architecture to provide for data logging and facilitate communication that can be used to pass translated data and otherwise communicate between security applications.

FIG. 6B provides an illustrative diagram 621 showing how a relational database can be implemented in an alternative architecture to provide similar capabilities. In this example a database can be established to log all threats as they occur. This database establishes a de facto data structure that can be used with scripting to invoke specific functions or services. For example, as indicated by numeral 621, the database identifying threats can have a field for originating VM capability, threat severity level, source, originating VM associated client, a link to associated metadata, and other information. If a VM receives a broadcast notification of a threat record from a specific VM, or from a VM matching a specific alphanumeric capability (e.g., from an IDS), another VM can be automatically invoked and passed the specific threat record as an argument. Note that the relational database model can also be used to manage credentials for various clients, generate alerts, identify the client infrastructure, sort metadata, identify VMs, and store policies for specific VMs (e.g., in a manner that can be called up an easily edited by a client administrator). For example, as indicated by an alerts database 625, different thresholds can be used to generate different types of alerts, for example, using different communication mechanisms, provided to different client personnel, or in another manner.

For both FIGS. 6A and 6B, not all possible templates or databases are shown, and it is within the capability of a software designer with experience in these fields to build a translation and normalization model using a template, object or relational database model (e.g., using a model-view-controller architecture) and to rely on a standardized interface for passing communications and arguments back and forth between machines, and generating associated reactions. As shown below, a standardized interface permits security software product vendors to adapt their products to make use of capabilities provided by other machines, or to employ APIs to facilitate data exchange and translation. The use of a memory management architecture that provides for enforced real-time queries as well as more long term (e.g., sophisticated) processing also leads to enhanced system capabilities.

Figure 7A:
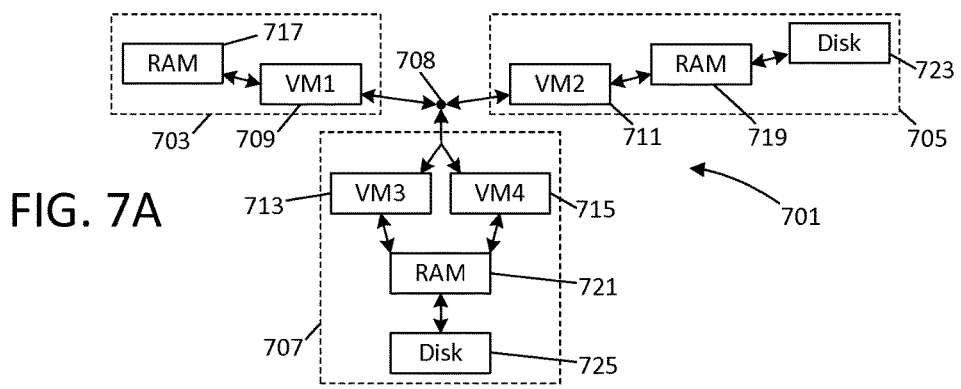
FIG. 7A provides an illustrative diagram 701 showing an example of a security network premised on four VMs (709, 711, 713, 715) running on three physical machines (703, 705, 707).

FIG. 7A provides an example of a hypothetical configuration 701, in this case, consisting of three physical machines 703, 705 and 707 and four VMs 709, 711, 713 and 715. Note that as was introduced earlier and as is represented as running on the third physical machine 707, more than one VM (e.g., 713/715) can be employed on any physical machine. As before, each physical machine can be a computer (e.g., a server) running emulation software to permit VM instantiation irrespective of physical machine characteristics. Each VM can also be any type of security software product, such as a IDS, IPS, VAT, SEM, AVS, FWS, and so forth, as was similarly introduced earlier. Also, either or both of the VM application software and/or emulation software can be presented as instructions stored on computer- or machine readable storage (i.e., a physical form of storage media, such as an electromagnetic or optical disk, electromagnetic, state change, resistive, or flash memory, or another physical device that provides storage accessible to a computer).

The first VM 709 is indicated as having dedicated random access memory ("RAM") space 717, the second VM 711 is illustrated as having both RAM 717 and a local disk 723, and the third and fourth VMs 713/715 are depicted as sharing both RAM 721 and disk storage 725. The RAM 717, 719 and 721 represents any form of "quick" or "fast" "access memory," that is, memory local to the physical machine and providing relatively fast access times; while depicted in FIG. 7A as comprising RAM (e.g., dynamic RAM), other forms of memory, volatile or non-volatile, can also be relied upon for this purpose. The fast access memory is to be distinguished from relatively slow memory that does not necessarily provide real-time response capability, such as a mass storage device (represents as disk 723 or 725). This latter memory can be physically part of, or attached to the respective machine 705 or 707, or positioned at another location within the network. As represented by 708, each physical machine interacts with other physical machines using a network access path, that is, via a wide area network, where communication is in the form of packet-based transmissions between VMs or between a VM and any cache or "slow" memory. Each physical machine has a communication interface (e.g., a network transport or TCP manager dedicated for this purpose), not seen in FIG. 7A.

To further illustrate interaction between these machines, the manufacturer of each security software product may specify required amounts of RAM or other fast storage, disk storage capacity, or other parameters needed for effective application execution and interaction with other VMs. Reservation or configuration of this memory can be established at VM instantiation, e.g., at run-time. Additionally, any APIs needed to interface an associated software application with the network environment (including other VMs) may also contribute to the required RAM and other memory capacity reservation requirements.

Figure 7B:
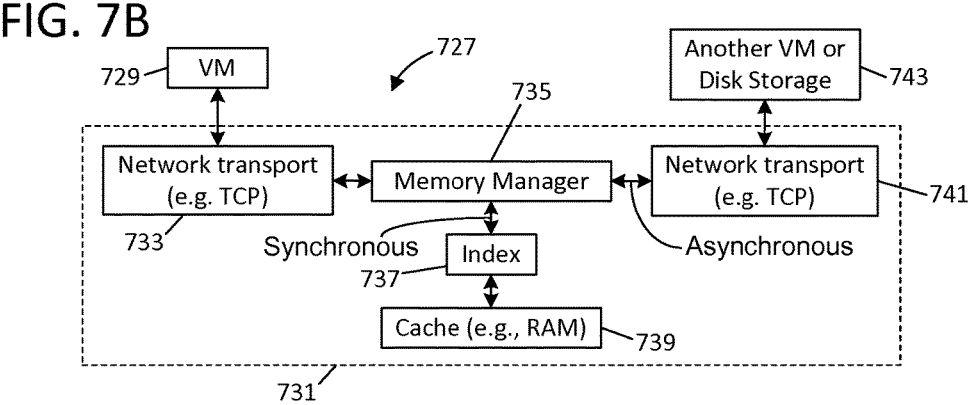
FIG. 7B provides an illustrative diagram 727 showing a memory management scheme for cross-VM interaction; the scheme depicted in FIG. 7B may be implemented per VM, on a machine running a VM platform, or as a separate installation (e.g., a separate piece of hardware).

FIG. 7B provides more detail regarding a cache-style management scheme that can be employed by a VM. This scheme is represented in FIG. 7B by reference numeral 727. In particular, it should be assumed that a VM in question (731) is to receive message queries, notifications or configurations from other VMs, represented by box 729. An inbound message (e.g., a query) may require a real-time response, or alternatively, may not require such a response. Note that each inbound message uses a common communication format (CCF) such as was identified earlier, such as for example a look up to determine whether any VM is aware of a "high" threat level associated with IP Address (identifier) 123.123.123.123. Each inbound query is forwarded from a network transport layer 733 to a memory manager 735. The memory manager first determines whether a given inbound communication requires a response within a predetermined period of time (e.g. whether it requires a "real-time" response). This determination can performed a number of different ways, dependent on desired implementation. For example, in one embodiment, each inbound query can include a command or field that specifies a response time (e.g., that includes a specific time parameter, or that presents a bit or field alerting the memory manager that a response is to be provided within a defined interval). In other embodiments, this determination can be based on the source of the message (e.g., VM type), on a specific command included with the query (e.g., where "command A" specifies an operation and "command 'A-1' specifies the same operation but mandates a fast response), inferred based on circumstance, or in some other manner. In the schema used in one, specifically contemplated implementation, each inbound query either specifies fast response (e.g., <1 millisecond or "1 ms") or it does not specify this fast response, and the memory manager reacts differently depending on this specification; if there is a need for a fast response, the memory manager checks an index 737 and local cache 739 for data representing a response, and immediately forwards any data that it has. This forwarding occurs via TCP-based network exchange via box 733. If no matching data is found, no data is provided back to the source of the message (i.e., either a null response is provided within the predetermined time frame of 1 ms, or no response is provided and the original source of the query assumes the response is null). In the event of such a "cache miss," the VM 731 can perform more sophisticated processing that is not expected to provide a real-time response, either performing the processing itself, by forwarding a request for processing to another VM or by retrieving data from slower storage (e.g., mass storage), all as represented by box 743. As denoted by box 741 and the term "asynchronous," this operation can be performed using a network transport process, and results in the memory manager 735 updating its cache (and potentially its index) responsive to this query, but generally not automatically sending response data (e.g., after the predetermined response interval) to the original source 729 of the inbound message.

If an inbound query is determined to not require a fast response, the operation can be quite different—for example, the memory manager 735 is not required to send a cache-based response, but instead can await completion of processing responsive to the query (e.g., potentially involving relay of a configuration or query, or an entirely different query) to another VM 743; only once this processing is complete and/or a response received from VM/mass storage 743 is substantive data responsive to the original, inbound query returned to VM 729. Note that slight variations in this methodology can be applied, dependent on embodiment. For example, in one implementation, if no fast response is required, the memory manager 735 can indeed fill the response with data from cache and then send a second response with updated data as soon as the "asynchronous" operation is complete. As denoted by the term "synchronous," the memory manager can be made interrogate its index 737 and local cache 739 immediately in response to the inbound query, with an immediate, automatic response if a match is found. By contrast, as denoted by the term "asynchronous," for some operations, the VM 731 is primarily concerned with updating its cache and may or may not be required to provide a (further) response to an original source of the inbound query.

Reflecting on the schema introduced by FIG. 7B, several advantages and benefits should be apparent. First, by providing cache-style management, with a synchronous/asynchronous response structure, both enforced real-time processing and more sophisticated query processing can be supported. If it is for example assumed that the first VM is a FWS and that VM 731 is an IPS, the FWS can issue a query to check whether a new syn packet represents a threat. This query can have multiple fields, such as a field for sender IP address and a custom-configured or vendor-configured question, such as whether a threat level="high" (another field) is associated with the provided IP address; using another typical example, the IP address can represent a destination IP address or other identifier (e.g., associated with inbound or outbound traffic), and the threat level field can be configured to query whether the IPS is aware of any vulnerability associated with the destination, or whether the destination represents (for example) a dangerous website. The query can pass a template between machines, with some or all fields of the passed template populated and used to scan for a match. A query can, depending on configuration, itself expressly demand immediate response, or this can be understood from context by the recipient (e.g., based on the fact the original source is of a "type=FWS"). The IPS 731 searches its index 737 and cache 739 and (hypothetically) determines that the provided IP address indeed does have a threat level associated with it of "high"—with this data being stored in fast access memory, the VM 731 is capable of immediately sending this data to the FWS in the form of a notification response, and the FWS (receiving this information within the specified interval) then can block the session represented by the new packet. This type of processing can be applied to any form of Internet traffic, including email exchange for example. Changing the hypothetical, if the IPS 731 did not have a match in local memory, the FWS would either receive no response or a null response, and would presume (based on no response within the specified time) that no threat existed; the IPS 731 optionally could then to asynchronously investigate the query, for example, using a query to another VM (743, for example a VAT, enquiring via separate query whether the provided IP address was associated with any issues). The VM 743 could perform sophisticated processing (such as by maintaining a count of such queries, or performing processing or other analysis of metadata associated with the original query). If VM 743 then determined responsive to such a query that a threat was associated with the provided IP address, it could then provide an "asynchronous" response to VM 731 which then would update the cache 739 and index 737 as appropriate. Note in this example that the query from IPS 731 to VM 743 represents a type that does not require fast processing, and so VM 743 is not required to pass a response back to IPS 731 until its processing is complete. Thus, as should be apparent, a multi-tier response structure (e.g., involving two or more response periods such as described) facilitates interaction between security products using a common communication format (CCF). Similarly, from the vantage point of any particular security software product vendor, integration is facilitated by an understanding of a command structure that permits leveraging a framework for response types based on need; this facilitates a powerful infrastructure, with fast response timing relatively insensitive to the number of VMs implemented or the number of physical machines employed; this greatly enhances scalability.

Figure 7C:
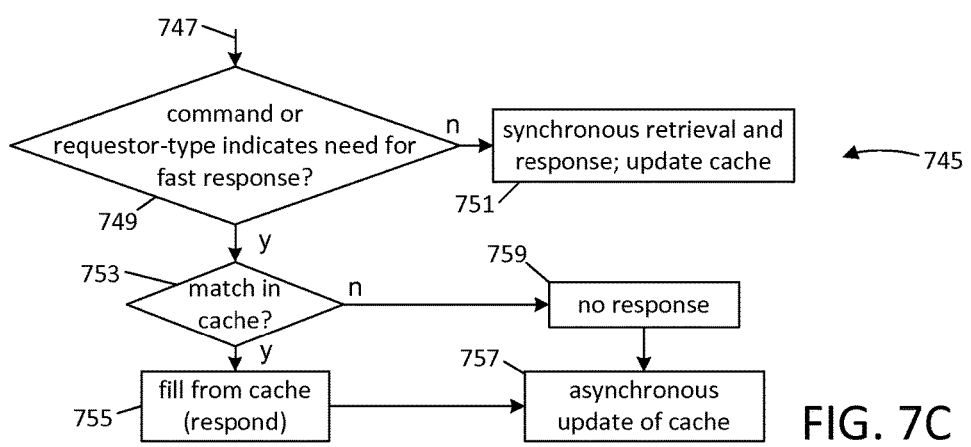
FIG. 7C shows a method block diagram 745 used to explain a two-tier memory management scheme that supports both enforced query response time as well as asynchronous response times.

FIG. 7C provides a flow diagram 745 associated with the memory management scheme just introduced. In particular, the need for fast response can first be determined, as represented by decision function 749. If such a quick response is needed (y) and a match is found in cache per decision block 753 (y/y), the data is retrieved from cache and sent back to the source of the query, per block 755. The process can then optionally continue on to also asynchronously update the cache, per numeral 757; as mentioned, this update can be performed by the VM in question (depending on its function) or can be filled from remote storage or in response to a further query to another VM. If the inbound query requires a fast response, but the cache does not contain data responsive to the query (y/n), the VM in question can perform retrieval and response outside of the predetermined time period, updating the cache as data is obtained, per function blocks 759 and 757. The withholding of the "fast" response within the specified time period permits the original source to presume that there is no threat, i.e., to equate no response with no threat, in real-time. In contemplated embodiments, no response need ever be provided to the original inbound query even once cache is updated (e.g., an FWS may have moved on to other real-time actions and may have no current need for this data). At the same time, facilitated by the cache update, the VM in question is ready to respond, with data on hand and adapted for fast, cache-style access, should another, similar query be prospectively received (whether from the same source of the original query, or another VM). Alternatively, if the inbound query does not need an immediate response (n), data can be retrieved and forwarded to the original query source once it is obtained, per function box 751 (e.g., when available, irrespective of any predetermined time period defined for fast response).

As should be apparent to those having skill in computer programming, FIG. 7C illustrates a two-tier timing structure for responding to queries, but three, four or greater tier architecture can also be used, each tier providing processing for messages having different needs. The two-tier example presented in FIG. 7C is illustrative only.

Figure 7D:
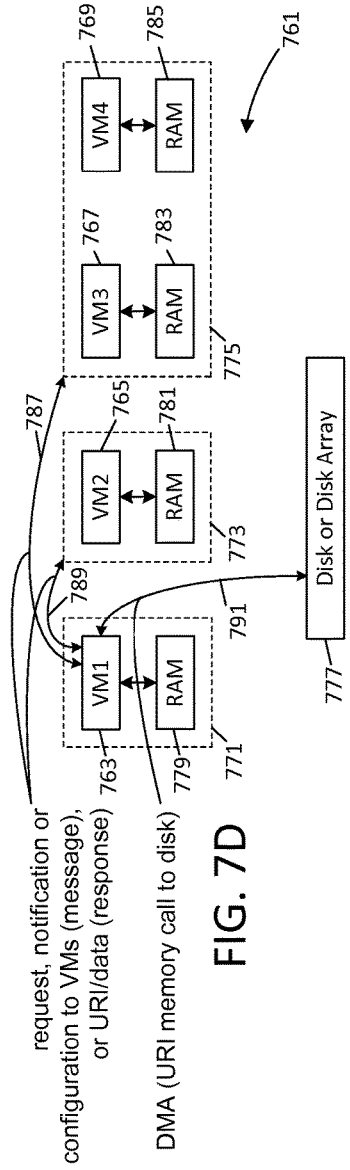
FIG. 7D provides an illustrative diagram 761 used to explain an example interaction between VMs and memory, for example, using a four VM/three physical machine implementation, as introduced by FIG. 7A.

FIG. 7D helps further illustrate these principles. As with the embodiment introduced by FIG. 7A, three physical machines 771, 773 and 775 are illustrated, supporting four virtual machines 763, 765, 767 and 769. Each physical machine also has local fast access memory 779, 773 and 775, respectively. In this example, however, a central, mass storage device 777 is used as a centralized, TCP-accessible network asset; note that for some implementations, the fast access memory could similarly be configured as a centralized network asset, if accessible quickly enough via the network to meet specification.

FIG. 7D highlights communication flow originating from one VM, 763. That is, a first arrow 789 represents a network connection between this VM and the second physical machine 773, a second arrow 787 represents a network connection between this VM and the third physical machine 775, and a third arrow 791 represents a network connection between this VM and the mass storage 777. It should be understood that each other VM (765, 767, 769) generates similar communications to other machines (or VMs) and storage, but arrows representing these connections are omitted to simplify the figure. The communication flow of these other VMs should be assumed to be identical to VM 763. More specifically, each VM can send a message (query/request, notification or configuration) to any other machine, either intended for a VM, or in the form of a direct memory access to the other machine or to the mass storage 777.

Figure 7E:
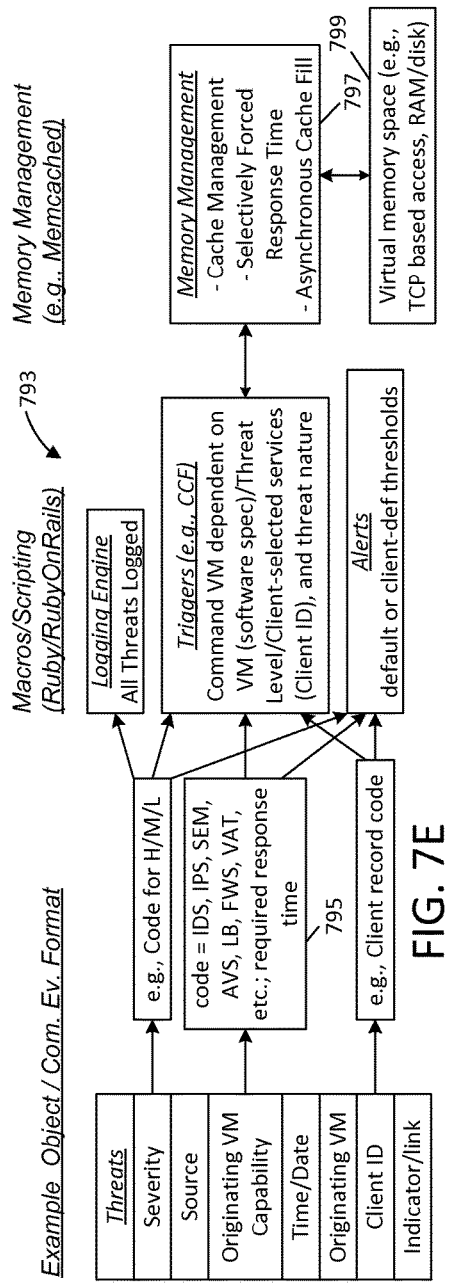
FIG. 7E provides another illustrative diagram 793, used to explain how templates (or objects) can be employed with scripting and standardized data and memory interaction to generate reactive capability to detected intrusion or to other events.

FIG. 7E provides another illustrative diagram 793, used to explain how a model-view-controller architecture can be employed to generate communication between machines and otherwise provide reactive capability to detected intrusion or other events. This figure is used to build on the relational DB model introduced with respect to FIGS. 6A-6B and to further explain how individual record (or template or object) attributes and fields can be automatically invoked in a reactive manner based on a CCF, e.g., in response to detected threats. Notably, the left side of FIG. 7E provides an example object ("Example Object CEDF") with exemplary fields listed within that object ("severity," "source," "originating VM Capability," "Time/Date," "Originating VM," "Client ID" and "Indicator/link"), the middle of the figure provides some examples of threat levels and VM capabilities that can be used for scripting on a client/specific basis, and the right side of the figure identifies possible scripting (as denoted by the right-side header "macros/scripting"). In a web application embodiment, a templates structure is used and the scripting is advantageously implemented using an open source framework suited for web application development and associated inter-application function calls, such as Ruby and Ruby On Rails. More specifically, as seen in the middle of FIG. 7E, the detected threat level can be used by notification or configuration messages to invoke specific actions, based on an isolated threat record, or based on a voting or other sophisticated behavior (e.g., a rule invoked if two IDS systems separately call out the same the threat). Attention is drawn to box 795, which identifies one framework for identifying device capability (e.g., based on VM type) and for providing a response framework that meets real-time requirements (or other response timing specifications). A VM type field for the source of a query can be used in a number of ways; for example, if the VM which identified the threat (Originating VM) has an "IDS" capability, this argument and the identified threat level can be scripted to invoke configuration of a VAT VM (if the client has elected to use this service) to automatically retrieve linked metadata to identify the destination that the threat was addressed to and run a specific vulnerability assessment scan of the identified destination, e.g., a server configuration scan. The invoked VAT can then be used to automatically provide data back to the client identifying whether or not vulnerability exists, all without human intervention. The type field can also implicitly convey required response time, i.e., in some embodiments, each VM can be configured to "understand" that if a query source is a FWS (for example) that immediate or other specification-defined response time is required (e.g., less than 1 ms, as mentioned); alternatively, response time can also be specified by a query itself (e.g., using a specific response time field, a dedicated command type, or in some other manner). Note that unlike a SEM product which might be custom-programmed to interlink two sources, the virtualization architecture set forth herein permits any number of products to act in parallel including products of different vendors, and to be dynamically varied—in addition to a VAT for example, scripting for a threat from an "IDS" VM can be evolved automatically or manually updated to additionally invoke a FWS, as has previously been mentioned, to block further traffic from the identified source. As alluded to previously, this capability is not simply dependent upon SEM processing of historical data, i.e., message exchange between machines (e.g., a CCF such as request, notification and configuration messages) can be used to add reputations to possibly threats, to rank threats that align with detected vulnerabilities, or take other actions without awaiting extensive correlation of past data. Note that the use of these functions also requires less data logging; that is, a SEM traditionally might log vast amounts of data; by permitting function calls between different machines, and correlation of SEM patterns with detected vulnerabilities or other VM products, the amount of data processed can be filtered and restricted to events or data meeting specified thresholds, all on a dynamic, reactive basis. The performance of logging ("logging engine", generation of reactive triggers, alerts to clients or to an operator of a security services network) is represented at the right-hand side of FIG. 7E.

It has previously been mentioned that a common communication format (CCF) implements a standardized communication protocol that includes predefined message types that can be understood by each VM in the security network. For example, in one embodiment, by filtering detected events and responsively generating one of a request for information (request), notification (of detected events) or (request for new) configuration, each machine can be made to report events, to query other "listening" VMs (or specific VMs) for confirmation of detected events or threat levels, and to invoke rules, new machines or other reactions to detected events. This functionality as mentioned can be natively supported by different commercial security products or otherwise implemented via an API that sits atop such security products, and it permits different vendors products to speak to one another, to pass arguments (e.g., data) back and forth, and to provide honed results based on threat reputation assessment by dialog with other products. In addition, it can be leveraged to drastically reduce the amount of data processed by the security network, by improving capability of specific VMs to filter data and report and log just those events meeting certain thresholds.

Note that the right hand side of FIG. 7E shows a memory management column; as just indicated, in some embodiments, a common communication framework can provide a defined mechanism for different VMs to interact with each other and also to interact with memory. For example, as represented by boxes 797 and 799, a memory management scheme can be employed where each individual VM or the system itself maintains a local cache in fast access memory. If a VM itself needs access to data in a local cache, this of course is near-instantaneous, but as noted by box 799, TCP-based interaction can also be provided for each other security product VM in the security network. As described above, a selectively-forced response time can be provided for certain command types needing immediate access to information (e.g., for commands from a firewall system, for example); if no data exists responsive to a query (e.g., a query as to whether a new syn packet associated with a particular IP address or IP address range presents a threat), no response to the query is returned, effectively causing the FWS (in this example) to equate no response with a negative response and allow admission of the particular session. On the other hand, as previously introduced, an asynchronous process is then also triggered to further resolve the issue (e.g., transparently to the FWS), such that, if the particular IP address or IP address range does present an issue (e.g., previously determined vulnerability for destination IP or a high security threat), future requests from the FWS will find updated data in cache sufficient for immediate response (i.e., a future session would be blocked by the FWS). In this manner, a standardized integration and interaction architecture can accommodate a need for real-time response, and also accommodate more complex network security queries that take time to investigate.

Figure 8A:
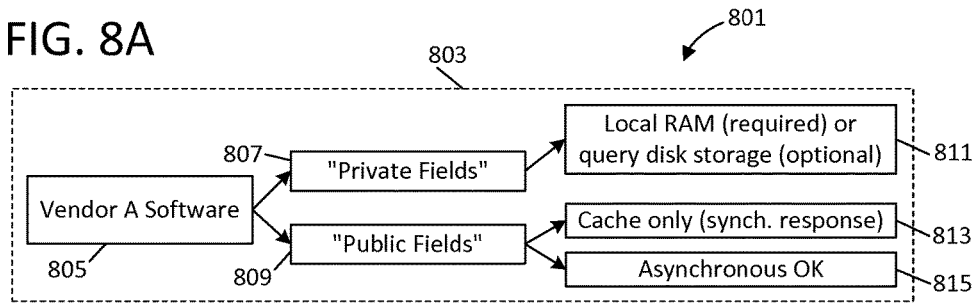
FIG. 8A provides a diagram 801 used to explain integration from a vendor's perspective, e.g., one scheme that permits vendors to designate "public" fields (available for standardized interaction between software products from different vendors) and "private" fields (unique to the vendor).

FIG. 8A provides an illustrative diagram 801 used to illustrate integration from a security software product vendor's perspective. The depicted scheme permits vendors to designate "public" fields, available for standardized interaction with VMs from other vendors, and "private" fields that are unique to the vendor (but may be shared across that vendor's different products). A dashed-line box 803 in FIG. 8A represents a virtual machine (VM). Relative to the principles introduced in the discussion of FIGS. 7A-7E, the vendor defines operands in the vendor's application software 805 to either represent private fields (807) or public fields (809). Private fields are typically proprietary to the vendor, and are maintained in memory (but not necessarily as part of the "cache" used to serve data to other machines); that is, typically private fields are stored only in private memory or in local disk storage (represented by box 811). Public fields (809), in turn, are those that are published and made accessible to other vendors for use in connection with their security products, with interface either being established natively by the vendor's own code (i.e., code that is par to of the security product) or via an API (written either by the vendor or by an entity providing the VM infrastructure). A function of the API for example, might be to equate vendor specific codes with the "string based" format indicated earlier and its specific fields (or similarly, to access a database using standardized protocols). Public fields (809) typically can be directly accessed from the network (e.g., as DMA), and can either be stored in cache 813 or "slow" memory (e.g., as part of an asynchronous process 815).

Figure 8B:
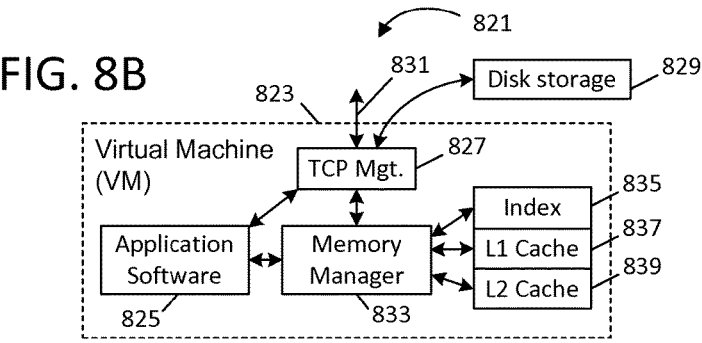
FIG. 8B shows another example 821 of a memory management scheme for a VM, namely, one that relies upon multi-level cache management techniques.

FIG. 8B presents a diagram 821 used to example another embodiment of a memory management scheme slightly more complex than the one introduced above. A VM 823 and/or its support infrastructure can feature modules for TCP management 827 (e.g., WAN communication management), application software 825, and memory management 833; a module in this context should be construed to refer to function-specific code, hardware, or code running on dedicated hardware, as appropriate. Message exchange 831 relies on the TCP management module, with messages being sent externally to other VMs or network-accessible storage 829, as appropriate, and being internally routed to the application software 825 or the memory manager 833, as appropriate. In this embodiment, the fast access memory is organized into three different databases or partitions, 835, 837 and 839. A first database, represented by index 835, stores what is effectively a network map, and contains templates or pointers to templates identifying available machine configurations (e.g., available VM resources, whether currently activate or otherwise). The index permits the VM 823 to selectively request configurations that invoke other VMs (e.g., for specific types of processing); similarly, the index typically identifies capabilities of these other machines, such as VM type. The index permits the VM 823, when it receives a query, to send further queries to (or request configuration of) other VMs and/or the disk storage 829, as appropriate. A first level "L1" cache 837 provides a database containing complete responses for queries that require fast access; for example, using the FWS example provided just above, if VM 823 represents an IPS and a query response represents a Boolean decision that "yes (there is a high level threat associated with the source's request)," this type of response would typically be provided directly from the first level L1 cache 837. Note that memory space associated with this cache space may be limited depending on physical hardware and the presence of other VMs running on that hardware; the memory manager 833 can rely upon a cache eviction protocol to purge stale cache contents based on frequency of use, time since last use, type of data, any combination of these things, and potentially other factors. The second level "L2" cache 839 is typically used to store response data as well as a referral for non-cached data; the "L2" cache may store data that is stale and occasionally needs updating, either based on functions of the application software 825, or based on queries to other VMs or disk storage, represented by numerals 831 and 829. For example, if VM 823 instantiates a vulnerability assessment tool, it may be that it possesses "fresh data" in L2 cache which is immediately served up to the requestor; alternatively, if a predetermined period of time has passed, the VM 823 may refuse to pass data and instead update "L2" cache contents, e.g., by query to another machine. To provide still another example, entries or records in the "L2" cache may contain pointers (e.g., locators such as URIs) to sources of non-cached or data, such as archives, metadata, or other types of data, and it may pass these pointers back to the original source of the query, such that the original source can then directly access that data. The L2 cache can also have limited capacity (e.g., dictated by available RAM of the physical machine running the pertinent VM) and can be managed using cache eviction strategies, as introduced above.

As should be apparent, this design is exemplary only, and many other designs will occur to those skilled in the art for effecting efficient interaction between different VM products.

Figure 8C:
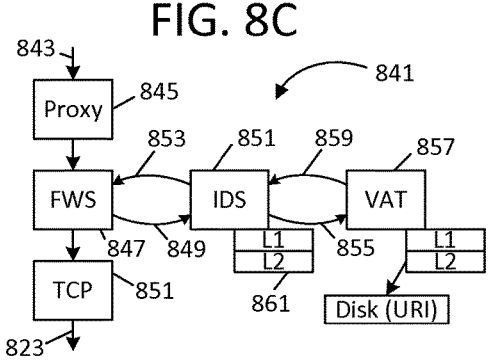
FIG. 8C shows an example flow diagram 841 in a hypothetical implementation having a FWS, an IDS and a VAT.

FIG. 8C provides an illustrative diagram 841 which helps to further illustrate processing in one hypothetical configuration. Inbound web traffic, for example, received at a hosted security proxy site 845, is forwarded to a virtual firewall system (FWS) 847. The FWS broadcasts a TCP-based query to the security services network, per communication arrow 849, enquiring whether a source or destination IP address associated with the new traffic represents a known threat. This query is picked up by one or more IDS VMs 851, which interrogate their respective L1/L2 caches as appropriate; if it is assumed that an immediate response is required (as in this example), the L1 cache is examined. In alternate embodiments, the L2 cache or both the L1/L2 caches are examined. If one of the IDS VMs (851) is successful at matching the query to one or more IP addresses in its fast access memory (i.e., in its L1 and/or L2 caches in this example), and identifies a threat level (e.g., threat>low), then it sends an immediate response (as designated by response arrow 853) to the FWS VM 847, which then blocks the new traffic. The IDS VM in question can further relay this information (i.e., as denoted by arrow 855) to another VM, for example, a vulnerability assessment tool (VAT VM 857) either in response to the query or on an unsolicited basis (e.g., the VAT may keep a count of hostile accesses for different IP addresses or address ranges). A configuration request can also automatically be generated and sent for specific, new services, e.g., for a port scan responsive to unusual traffic patterns. Note that if more than one IDS VM is used, each VM can be assigned to a dedicated FWS (or other specific systems, or otherwise partitioned such that the identically-functioned VMs do not overlap in responding to a common request). If the IDS VM cache 861 resulted in a miss, the IDS VM 851 would not respond (or provide a null response within the predetermined time frame, e.g., 1 ms), thus permitting FWS VM 847 to forward (permit) the new traffic, which would be send to a TCP manager 851 and thereafter forwarded to the intended destination, per numeral 823. Assuming this traffic did represent a threat which the IDS VM was initially unaware of, the VAT VM 857 might identify data representing this threat from its L1/L2 caches, and it might respond via communication 859 to the IDS VM 851, which then would update its cache(s) as appropriate. If necessary or appropriate, the returned data could contain operands (e.g., threat=high, IP address="w.x.y.z:80") or a URI pointing to sources of non-cached data, with the URI being stored in L1/L2 cache 861. As noted either, this scheme provides a framework that permits relatively slow, asynchronous processing to be managed as part of a common communication framework that supports fast response processing.

Figure 8D:
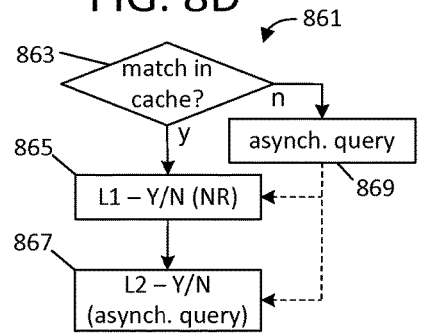
FIG. 8D provides a block diagram 861 used to explain one method for implementing multi-level cache management techniques in a VM security network.

FIG. 8D provides a block diagram 861 used to explain one method for implementing multi-level cache management techniques in a VM security network, and once again shows a two-level cache management technique. More specifically, a memory manager determines whether a match exists in cache, as represented by decision block 863; L1 cache, L2 cache, or both may be searched, with any located data being served from these locations, as represented by functional boxes 865 and 867. If a fast response is determined necessary and no data exists in the L1 cache, the original query is ignored or sent a null response (as denoted by "NR" no response designation in box 865). Alternatively, whether or not a fast response is needed, the L2 cache can be searched and an asynchronous update process initiated per function box 867. If there is no match at all in cache, an asynchronous update process can be initiated, as represented by functional block 869.

Figure 9:
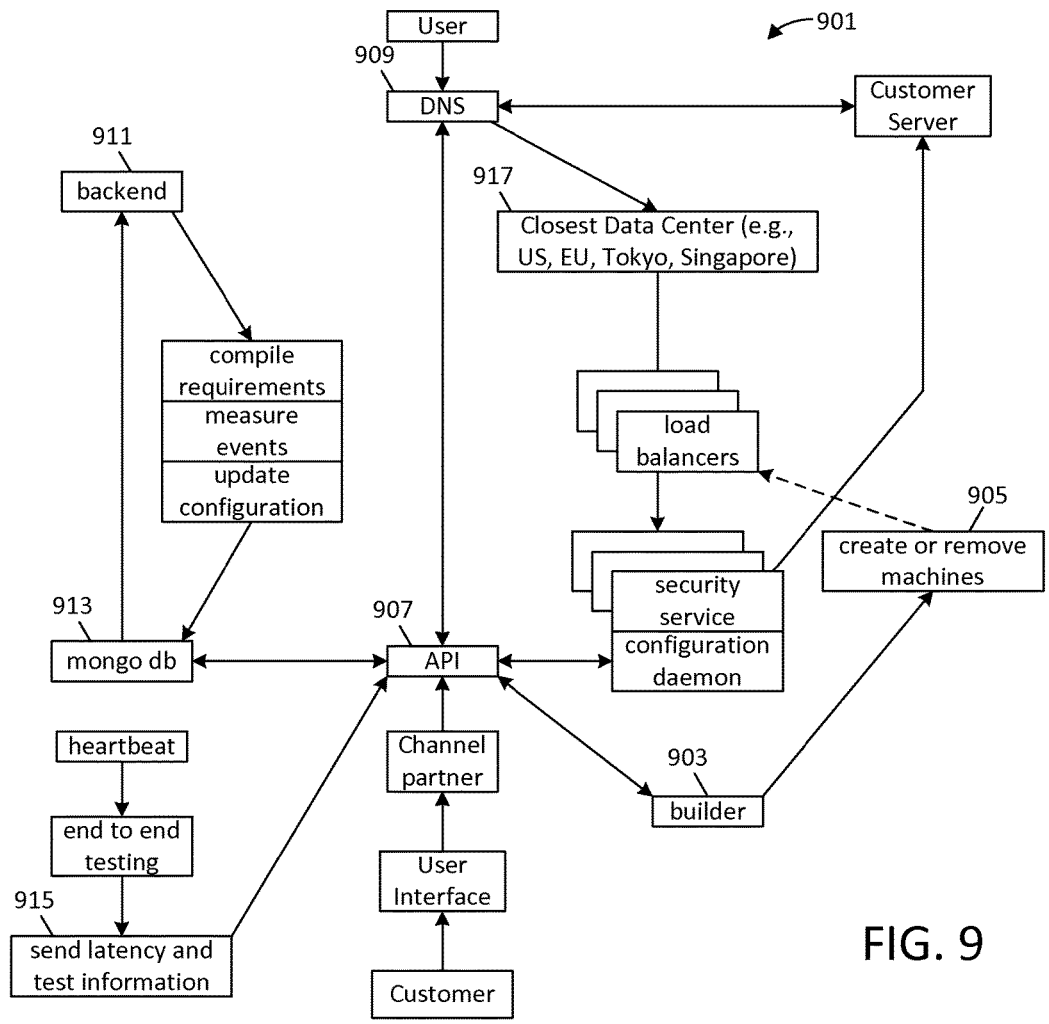
FIG. 9 shows a detailed functional layout 901 of a software design for a hosted security network that provides selective security services on behalf of one or more clients.

FIG. 9 shows a functional layout 901 where each box shows a different software component or module or an associated function associated with the building of a custom security network infrastructure. As indicted by numeral 903, a builder function is provided to a proxied administrator or client to design a custom security network using the VM architecture described above. That administrator initially configures and then dynamically creates or removes machines, per box 905. For example, alerts of a specific type may prompt the administrator to add specific antivirus software—this can also be done ad hoc by the administrator, e.g., to test a newly released product. The newly create VMs are monitored by load balancers within authorized limits, with new VMs configured as additional services, and traffic forwarding to the client network once processing is completed as configured by the administrator (see FIG. 3C). As reflected by numeral 907, the administrator (e.g., for a private network) can set up an API to provide for VPN access to channel partners or customer personnel, as well as secure web access for the purpose of dynamically managing the security configuration, for example, through backend 911. This API is also used to configure the proxy site or sites to which incoming traffic will be directed (and potentially outbound as well) and to update DNS listings (909) as has been described earlier. As represented by numeral 913, Mongo DB (or another template engine or a system that produces flat files) is used for generating templates representing configurations of the network and also for establishing the CCF (see, e.g., FIG. 6A and the discussion above). Configurations can be tested using Heartbeat, and made available to the client network administrator via API 907. Finally, as alluded to earlier, data centers can be set up in multiple locations—if the security service provider has such locations available, the virtualization infrastructure can advantageously permit the client network administrator to install machines in different geolocations including any desired proxies as appropriate. Public DNS can then be updated and used to route inbound network traffic to these destinations as appropriate.

Some Example Capabilities.

FIGS. 10A-10F provide some non-limiting examples of scripting that can be used to take specific, automated actions in response to threats detected by the IDS system. While these examples refer to specific capability types (e.g., "IPS"). There are many services that can be configured as VMs using the techniques described above, and that can interact with one another using the framework discussed in this disclosure; for example, as referred to earlier, a web cache application could be another VM type, as could an email authentication module—many such other services exist. The use of an IDS, and other exemplified VM types (e.g., FWS, IPS, VAT, SEM and so forth acting in response) and the memory management schemes discussed above are optional and used for example purposes only. That is, the architecture presented in this disclosure permits any one or more VMs to be elected by a client to interact with any other VM to provide network functions, in manner limited only by the CCF and any associated scripting. The following implementations are provided as non-limiting examples only.

Figure 10A:
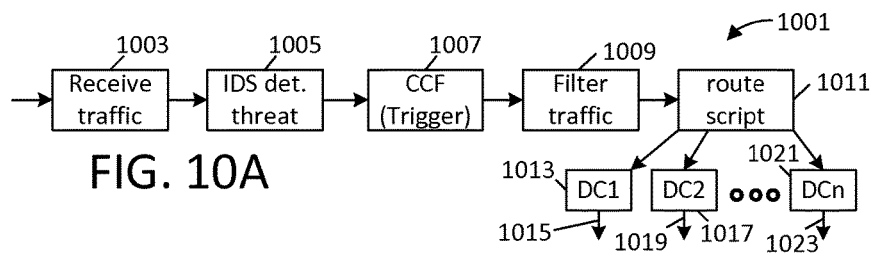
FIG. 10A provides a method diagram 1001 used to explain how results provided by an intrusion detection system (IDS) can be used to route data.

FIG. 10A provides a method diagram 1001 used to explain how results provided by an intrusion detection system (IDS) can be used to route data. More specifically, the figure illustrates a scenario where, responsive to a detected threat, traffic is routed to any specific one or ones of a number of data centers (DC1 . . . DCn). The traffic selected for this routing can be traffic representing the threat, or traffic not representing the threat. More particularly, as identified by reference numeral 1003, traffic is received at a proxy and forwarded to an IDS for processing (1005). The IDS can be implemented as an elective VM service by a network administrator building a customer security network. If the IDS detects a threat, a broadcast message (e.g., a response message, operating as a trigger) is generated (1007), relying on translated data to identify the threat. If appropriate, code associated with the originating VM or reactive scripting can be used to invoke one or more actions using VMs in response to the threat. As indicated by this example, it should be assumed that a detected threat is such that it is desired to segregate traffic by filtering (1009), with scripting used to route some traffic to a first data center (1013) and other traffic to one or more other data centers (1017, 1021). Traffic processed by the respective data centers can then be forwarded on, as represented by arrows 1015, 1019 and 1023. Thus, in a hypothetical situation introduced earlier, if an attack against a client network is being mounted from a specific country, it is possible to route that traffic to the data center closest to it (e.g., DC1, 1013), while routing other traffic to other data centers (e.g., DC2 .

. . . DCn, represented by numerals 1017 and 1021). If the IDS-detected attack is a denial of service attack, for example, attacks are automatically concentrated in data center DC1 without affecting the rest of the network, while the performance of the other data centers (DC2 . . . DCn) is improved by not being subject to these attacks. Clearly, many variations of this example exist, not necessarily involving threats, e.g., if a high volume of legitimate traffic arises from a particular geography, it is possible to distribute this traffic across different geographies using these techniques, e.g., for load balancing purposes; alternatively, a web caching service can be dynamically applied (e.g., if the traffic relates to media transfer, for example). Again, many variations on this basic model exist, some which do not use an IDS, which route traffic to specific geolocations and configure VMs based on dynamic observations.

Figure 10B:
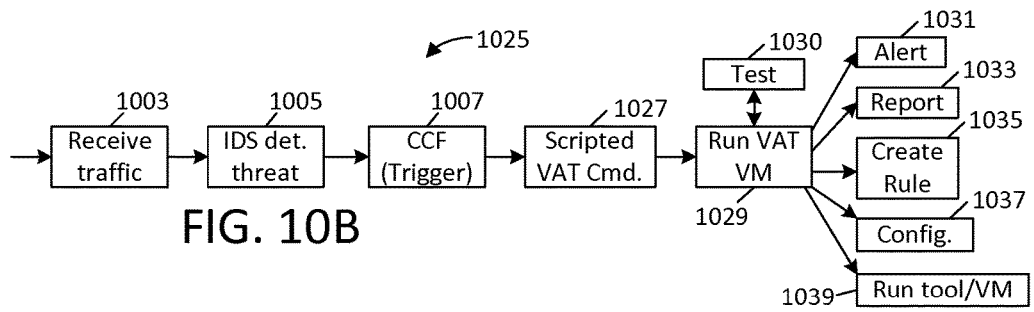
FIG. 10B provides a method diagram 1025 used to explain how results provided by an IDS can generate triggers which lead to automatic execution of a function by a vulnerability assessment tool (VAT).

FIG. 10B provides a method diagram 1025 used to explain how results provided by an IDS can generate triggers which lead to automatic execution of vulnerability assessment tools (VATs). In this example, like numerals represent the same functions introduced by FIG. 10A. That is, as indicated by numeral 1003, traffic can once again be received and screened by an IDS system (1005), with a CCF message being generated (1007), based on a detected threat. In this example, it is assumed that the particular private network administrator for which security services are provided has elected VAT services, such that a VAT VM is activated automatically, responsive to the detected threat. A predetermined command, for example a request for a new configuration, per function box 1027, activates the VAT (e.g., to perform a specific port scan or other testing of the private network)—these functions are represented by boxes 1029 and 1030. Note that there can be number of results that, if desired, can be scripted to also result from this process. For example, the VAT VM and/or the detected threat can be used to generate an alert to the private network administrator that a specific port or server misconfiguration should be corrected, to automatically generate a report, to automatically create new policies or rules (e.g., for a FWS or a IPS), to perform a system reconfiguration or create a new VM (e.g., an FWS where none existed before), run a tool, or take other types of actions. These functions are variously represented in FIG. 10B by numerals 1031, 1033, 1035, 1037 and 1039, and, again, many variations and alternatives exist.

Figure 10C:
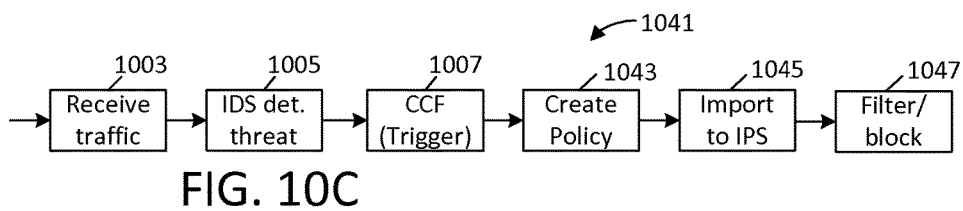
FIG. 10C provides a method diagram 1041 used to explain how results provided by an IDS can generate triggers which lead to automatic execution of a function by an intrusion prevention system (IPS).

FIG. 10C provides a method diagram 1041 used to explain how results provided by an IDS can be used in conjunction with an intrusion prevention system (IPS). In particular, upon receiving a trigger (1007), the IPS can be triggered to create a new policy, for example, to process, filter or block traffic in a specific way (e.g. per numerals 1043, 1045 and 1047). For example, if a network attack is detected as arising from specific country, the IPS can be configured to block all traffic arising from that country, or to implement a specific antispam filter, or to perform an additional level of authentication (e.g., DKIM "strict" hashing and authentication parameters, differentially treat traffic based on hashing algorithm used, and so forth), and so forth. An IPS generally, depending on specific product, can be used to invoke qualitative judgments that express different confidence levels, and different routing and treatment, based on sophisticated analysis of the traffic of the traffic in question.

Figure 10D:
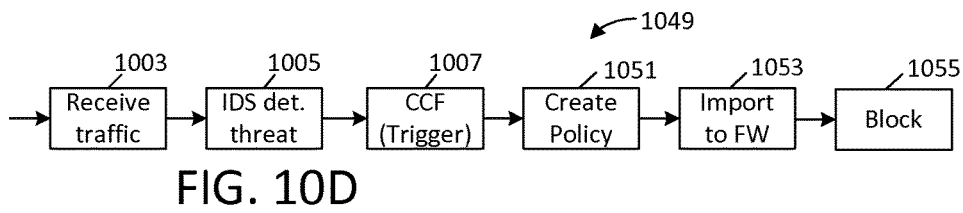
FIG. 10D provides a method diagram 1049 used to explain how results provided by an IDS can generate triggers which lead to automatic execution of a function by a firewall service (FWS).

FIG. 10D provides a method diagram 1049 used to explain how results provided by an IDS can be used in conjunction with a firewall service (FWS). This method is similar to the last one presented, except that instead of the more sophisticated treatment afforded by an IPS, the FWS is used to on a message-by-message basis block traffic matching specific parameters, for example, based on originating IP address. As before, a CCF (1007) can be used to create a policy or rule (1051), which then is imported into the FWS and used to block inbound traffic as appropriate (1053, 1055).

Figure 10E:
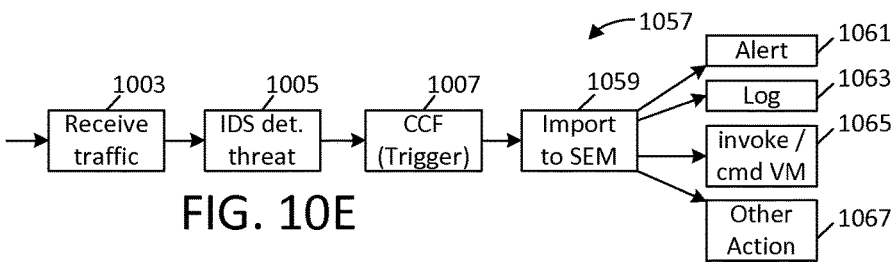
FIG. 10E provides a method diagram 1057 used to explain how results provided by an IDS can generate triggers which lead to automatic execution of a function by a security event manager (SEM) service.

FIG. 10E provides a method diagram 1057 used to explain how results provided by an IDS can be used with a security event manager (SEM) service. As mentioned earlier, some SEM products generate alerts or other specific actions as a consequence of detected threats. In this case, a specific SEM product can be invoked as a virtual machine, with dynamic communications exchanged with the SEM using a translated data and requests for information, and scripts used to take actions dependent on the output of the SEM; for example, a specific SEM can be invoked to generate a specific action and/or alert, return ranked threats or indications of permissive or scrutinized patterns of network access, to log only certain types of data, to invoke preconfigured actions by one or more other VMs, or to take another type of action, all as represented by numerals 1061, 1063, 1065, and 1067.

Figure 10F:
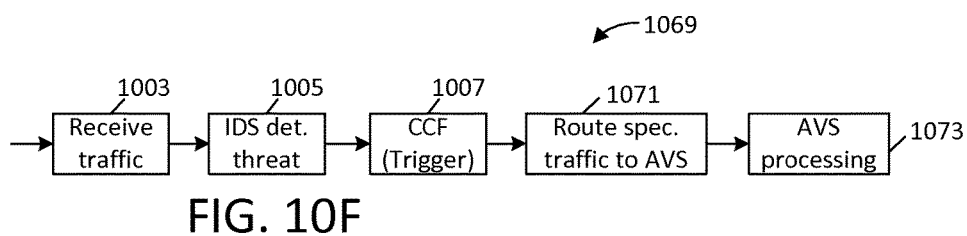
FIG. 10F provides a method diagram 1069 used to explain how results provided by an IDS can generate triggers which lead to automatic execution of a function by an antivirus service (AVS).

Finally, FIG. 10F provides a method diagram 1069 showing how a CCF (1007) can be used in conjunction with an AVS service. In this case, it should be assumed that the detected threat has been tied to a perceived source of a specific virus, malware, or similar problem. Thus, the CCF (1007) can be used to establish a new configuration redirect specific traffic (1071) to an AVS set up as a specific VM. The specific AVS product for example can perform specialized or enhanced screening (1073).

Commercialization And Business Models

Figure 11:
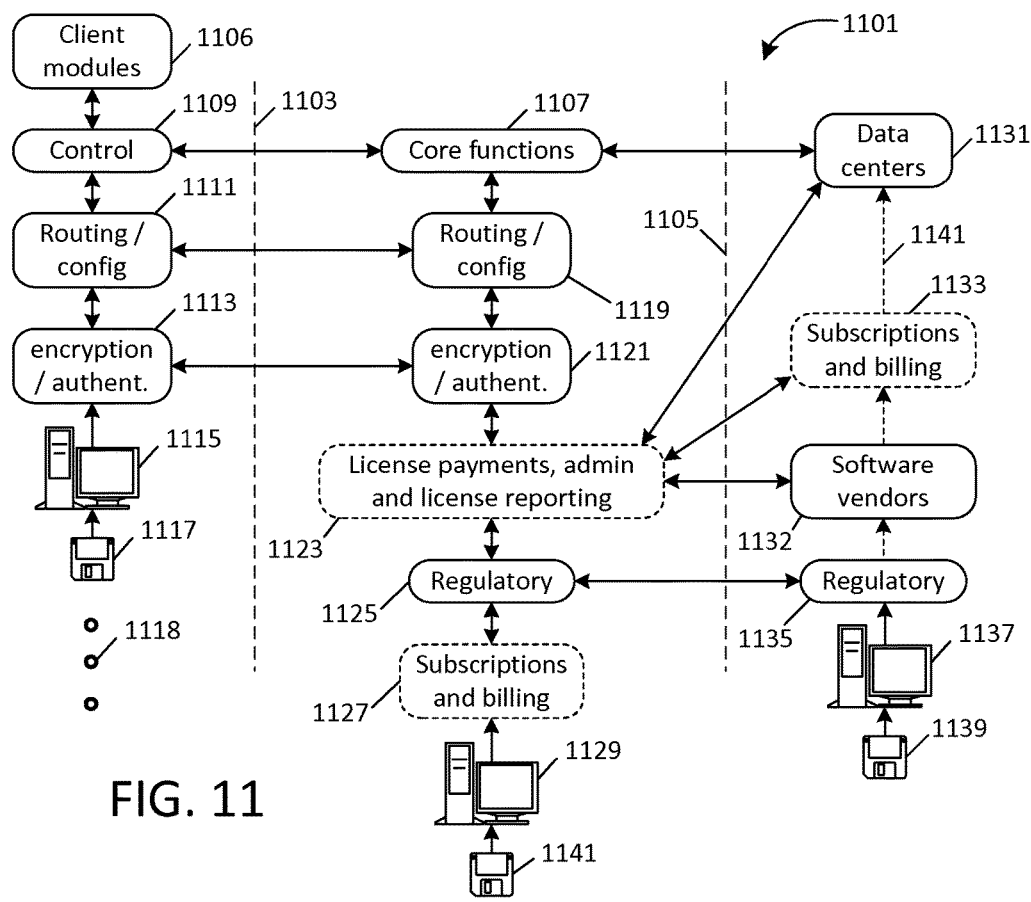
FIG. 11 provides an illustrative diagram used to explain different implementations and business models for administration of the various services, methods and techniques discussed herein.

FIG. 11 is used to explain different allocations of responsibility, depending on implementation, and to explain some differing business models. A general architecture is represented by numeral 1101, with the architecture divided into three horizontal partitions (separated by dividing lines 1103 and 1105), to indicate different locations where various software components or responsibility can be implemented. First, a leftmost partition represents software and/or modules that can be installed on a client network in some implementations, generally represented by reference numeral 1106. A middle partition represents functions that would typically be installed on the security services network. Note that as indicated earlier, for some embodiments, the functions of these two partitions can optionally be combined and implemented in one and the same network (e.g., the network of a large company or entity which provides its own security). Core functions (1107) typically include the virtualization architecture discussed above. Finally, the rightmost partition identifies software and functions that can optionally reside outside of the service provider network, e.g., either in the hands of the service provider or a trusted business partner to the security service, i.e., that provides select services collateral to those of the security services provider.

As for the client network, once again, configuration is left in the hands of a client administrator; the client network ideally supports infrastructure for establishing a secure tunnel with the security service for configuration, management and backend actions as appropriate. This functionality is represented generally by reference numeral 1109. In implementations that do not involve a web interface, the client network can be provided with a client module or specialized software that allows it to perform remote configuration and interaction; this software and its installation and control over a machine (i.e., a computer) is symbolized by icons 1115 and 1117 in FIG. 11. Note that if the virtualization architecture is to be distributed as a commercial software product, with or without software security products of various vendors, then this software product is also part of the machine readable media (denoted by disc icon 1117, although the machine readable media may be any form of memory, e.g., DRAM in a server). As mentioned, in one model, the virtualization infrastructure can be distributed as commercial software, with a software user then electively downloading individual security applications as desired. The client network also supports any desired routing or configuration of its infrastructure (e.g., to route outbound Internet traffic to the security services network, per the examples of FIGS. 4A and 4B, to change DNS entries for inbound traffic, and so forth), and for traffic encryption and authentication. Some or all of these capabilities can be provided to the private network in question, as mentioned, as a software product 1117. As denoted by ellipses 1118, client responsibilities identified by the left partition is typically replicated at least partially for each client or private network supported by the core functions 1107.

The middle partition of FIG. 11 is associated with the security services network. The associated responsibilities include providing the core functions (including VM support) 1107, infrastructure for routing and communication with each private network receiving security services 1119, and encryption and authentication (including VPN tunneling) services 1121. In addition, the security services network can also include modules to handle payment for third party software licenses and other costs, and to invoice its clients receiving security services, per numerals 1123 and 1127. For example, it was previously mentioned that one contemplated business model supports a micropayments form of licensing, where client networks are invoiced on a "pay-as-you go" basis, i.e., just for those third party software products that are used and just for the duration or volume of use. To provide one example, depending on the license fee structure utilized, a client installing and operating a specific IPS "for one day" can be invoiced for 1 day's use only, or on another abbreviated basis; the virtualization model is such that the client need not extensively configure its own internal systems to meet the requirements associated with the specific "IPS," and equally important, if the client decides to instead use another product, the client can elect to deactivate the associated VM without incurring annual license subscriptions or copy purchase costs; similarly, should the particular software vendor distribute a newer version replacement software, the security services provider can update its offering in a manner where the client is billed based on use, and thus, pays little if any for the upgrade. Naturally, other license fee or subscription models can also be used, e.g., a client network can be charged, without limitation, a flat fee, a monthly fee, an annual fee, a per service flat, monthly or annual fee, or on some other basis. The software that implements and supports these various functions, and the machine or machines that the software controls, are collectively represented using icons 1129 and 1130.

Note that the network of the security service provider communicates with different entities; (a) multiple clients, represented by the left partition, each one of which has one or more of the responsibilities represented by numerals 1106, 1111, 1113 and 1115, and (b) one or more third party entities such as services providers to the service bureau, represented by the right partition, such as software licensors and regulatory authorities; these entities are represented by numerals 1131, 1132 and 1135.

Elaborating on structure that can be outsourced or run as a complementary service to the security services network, the outsourcing of data center management provides a first example, 1131. If a third party provides this support, the license payments function of the service provider network includes payment functions as appropriate to compensate the data center providers, e.g., these payments if desired can be tracked and invoiced to the account of the client network they are used to support. Similarly, if per-use or per-client software fees are paid to individual software vendors, then license payments (and support as necessary) are provided to (and from) these entities, as represented by numeral 1132; note that a trusted link can be established for this purpose, e.g., to provide visibility and messaging access to support personnel. Other subscriptions and the optional outsourcing of client billing (e.g., for security services received) is represented by numeral 1133; again, such entities can be provided with trusted access, such as incremental billing information for each private network receiving security services. Generally speaking, any number of service providers to the security services network can be meshed with the security services network as represented by continuation arrow 1141. If necessary, the security services provider network can also provide these third parties with access into the security services provider network, for audit, accountability or other purposes.

A special case is presented by boxes 1125 and 1135, labeled "regulatory." For some fields of endeavor, particularly when dealing with health and safety, national security and financial administration, information possessed by the client network can be tightly regulated by governmental authority. Therefore, if warranted by the implementation and the specific business model, a third party entity (e.g., a regulatory agency, such as an agency of the government) can be provided with partial or complete visibility into the security and security networks of specific clients. For example, newer generations of laws provide for tight control over patient privacy and access to health records; depending on client business and the WAN traffic at issue, it may be desired under some circumstances to provide regulatory authorities with trusted, direct access to the private network, as well as to metadata, security configurations, records of client administrator services selection and other dynamic actions, and to other data, for accountability, national security, and other purposes.

Note that software modules to support any of the above interactions can be provided to these latter entities, as depicted by software and machine readable media icons 1137 and 1139; generally speaking, these modules support authentication and "trusted partner" connectively, to enable or facilitate electronic interactions with the security services provider, as described above.

CONCLUSION

It should be appreciated that by providing a flexible virtualization architecture that can support network security software products in any desired configuration, this disclosure provides specific examples of system, methods, services and software that greatly enhance network security. For example, this disclosure enables network security to be customized on a dynamic, individualized basis for each of multiple clients, e.g., via a common service bureau. These techniques can be extended to any private network, or hosted security for any private network, as well as commercial software products. Further, the teachings provided by this disclosure are not limited to intrusion monitoring and/or detection and reaction, but are applicable to other network and machine applications.

What has been described is a set of methods, software and systems design to implement network security services with a flexible architecture. Other applications will readily occur to those who design electronics or software in view of the teachings provided above, or in view of the invention defined by the claims set forth below. For example, while description above has focused on a template-based (or object-based or relational database) implementation for virtualization and translation, other techniques are also possible. Furthermore, while many of the examples presented above are rooted in intrusion monitoring and/or detection and response, other applications also exist.

Accordingly, the foregoing discussion is intended to be illustrative only; other designs, uses, alternatives, modifications and improvements are also possible which are nonetheless within the scope of the present disclosure, which is limited and defined only by the following claims and equivalents thereto.

We claim:

1. An apparatus comprising instructions stored on non-transitory, tangible, computer-readable storage, the instructions when executed to cause at least one computer of a first network to:
   receive a query from a query source, the query specifying an indicator of a possible network security threat;
   access a local database and process content of the local database to identify whether the local database contains data corresponding to the possible network security threat;
   determine a threat level associated with the possible network security threat;
   if threat level is not greater than a threshold, update the local database by transmitting a query from the at least one computer of the first network to at least one other computer via a wide area network (WAN), obtaining results from the at least one other computer, updating the threat level associated with the possible network security threat dependent on the results, and storing the updated threat level in the local database in association with the possible network security threat;
   if the threat level is greater than the threshold, transmit a response to the query source responsive to data in the local database corresponding to the possible network security threat without regard to whether at least one other computer possesses additional data regarding the at least one network security threat; and
   transmit, dependent on at least one of the threat level determined by the at least one computer of the first network or the updated threat level, a remedial measure to the query source to counteract the possible network security threat in a manner to cause a machine of the query source to automatically instantiate a policy to counteract the possible network security threat.

2. The apparatus of claim 1, wherein the local database comprises security event data associated with the networks of respective clients, and wherein the instructions are, when executed, to cause the at least one computer of the first network to update the local database in dependence on the security event data associated with the networks of the respective clients and to update the threat level for the possible network security threat in dependence thereon.

3. The apparatus of claim 1, wherein the instructions, when executed, are to cause the at least one computer of the first network to determine the threat level in dependence on the query from the query source.

4. The apparatus of claim 1, wherein the instructions, when executed, are to cause the at least one computer of the first network to determine the threat level by:
   matching the possible network security threat to content of the local database;
   retrieving an existent threat level value stored in the local database in association with the possible network security threat; and
   determining the threat level based on the existent threat level value.

5. The apparatus of claim 1, wherein the instructions, when executed, are to cause the at least one computer of the first network to update the local database by obtaining results from multiple data sources and by updating the threat level based on the results as well as preexisting content of the local database, to obtain the updated threat level.

6. The apparatus of claim 5, wherein the instructions, when executed, are to cause the at least one computer of the first network to obtain the updated threat level from the results from the multiple data sources and the preexisting content according to a voting process.

7. The apparatus of claim 1, wherein the instructions, when executed, are to cause the at least one computer of the first network to:
   if the threat level is greater than the threshold, transmit the response to the query source within a response time; and
   if the threat level is not greater than the threshold, not transmit any response to the query source within the response time.

8. The apparatus of claim 1, wherein the instructions, when executed, are to cause the at least one computer of the first network to:
   if the threat level is greater than the threshold, transmit the response to the query source within a response time; and
   if threat level is not greater than the threshold, withhold response to the query source notwithstanding the response time pending return of the results from the at least one other computer from over the WAN.

9. The apparatus of claim 1, wherein the instructions, when executed, are to cause the at least one computer of the first network to:
   if threat level is not greater than the threshold, transmit a first response to the query source within a response time, dependent on content of the local database; and
   transmit, following the response time, the receipt of the results from the at least one other computer and the update of the threat level, a second response to the query source dependent on the results from the at least one other computer, where the second response conveys the updated threat level.

10. The apparatus of claim 1, wherein the instructions, when executed, are to cause the at least one computer of the first network to:
    transmit the response on a broadcast basis to multiple network destinations, said response conveying the determined threat level which exceeds the threshold.

11. A method of processing security event data, implemented on at least one computer of a first network, the method comprising:
    receiving a query from a query source, the query specifying an indicator of a possible network security threat;
    accessing a local database and process content of the local database to identify whether the local database contains data corresponding to the possible network security threat; determining a threat level associated with the possible network security threat; if threat level is not greater than a threshold, transmitting a query from the at least one computer of the first network to at least one other computer via a wide area network (WAN), obtaining results from the at least one other computer, updating the threat level associated with the possible network security threat dependent on the results, and storing the updated threat level in the local database in association with the possible network security threat to thereby update the threat level in the local database; and if the threat level is greater than the threshold, transmitting a response to the query source responsive to data in the local database corresponding to the possible network security threat without regard to whether the whether the at least one other computer possesses additional data regarding the at least one network security threat; transmitting, dependent on at least one of the threat level determined by the at least one computer of the first network or the updated threat level, a remedial measure to the query source to counteract the possible network security threat; wherein transmitting the remedial measure is performed in a manner to cause a machine of the query source to automatically instantiate a policy to counteract the possible network security threat.

12. The method of claim 11, wherein the local database comprises security event data associated with the networks of respective clients, and wherein updating further comprises updating the local database in dependence on the security event data associated with the networks of the respective clients and obtaining the updated threat level for the possible network security threat in dependence thereon.

13. The method of claim 11, wherein determining further comprises determining the threat level in dependence on the query from the query source.

14. The method of claim 11, wherein determining further comprises:
   matching the possible network security threat to content of the local database;
   retrieving an existent threat level value stored in the local database in association with the possible network security threat; and
   determining the threat level based on the existent threat level value.

15. The method of claim 11, wherein obtaining further comprises obtaining results from multiple data sources and wherein updating further comprises updating the threat level based on the results as well as preexisting content of the local database, to obtain the updated threat level.

16. The method of claim 15, wherein updating further comprises causing the least one computer of the first network to calculate the updated threat level from the results from the multiple data sources and the preexisting content according to a voting process.

17. The method of claim 11, wherein:
   if the threat level is greater than the threshold, transmitting the response to the query source is performed within a response time; and
   if the threat level is not greater than the threshold, no response is transmitted to the query source within the response time.

18. The method of claim 11, wherein:
   if the threat level is greater than the threshold, transmitting the response to the query source is performed within a response time; and
   if threat level is not greater than the threshold, the method further comprises withholding response to the query source notwithstanding the response time, pending return of the results from the at least one other computer from over the WAN.

19. The method of claim 11, wherein:
   transmitting the response comprises transmitting a first response to the query source within a response time, dependent on content of the local database; and
   the method further comprises, if threat level is not greater than the threshold, and notwithstanding the response time, transmitting a second response to the query source dependent on the results from the at least one other computer, where the second response conveys the updated threat level.

20. The method of claim 11, wherein transmitting the response, if the threat level is greater than the threshold, comprises transmitting the response on a broadcast basis to multiple network destinations, in a manner which conveys the determined threat level which exceeds the threshold.

* * * * *